United States Patent [19]

Lunn

[11] 4,277,691
[45] Jul. 7, 1981

[54] ENERGY ALLOCATOR

[76] Inventor: Lawrence M. Lunn, 6902 S. Meridian St., Indianapolis, Ind. 46217

[21] Appl. No.: 48,615

[22] Filed: Jun. 14, 1979

Related U.S. Application Data

[63] Continuation-in-part of Ser. No. 841,840, Oct. 13, 1977.

[51] Int. Cl.³ .............................................. H02J 3/00
[52] U.S. Cl. ....................................... 307/35; 307/39; 307/117; 307/126; 364/492
[58] Field of Search ....................... 307/34, 35, 38, 39, 307/62, 117, 32, 126; 364/464, 492; 323/2, 3

[56] References Cited

U.S. PATENT DOCUMENTS

| | | | |
|---|---|---|---|
| 3,296,452 | 1/1967 | Williams | 307/62 |
| 3,872,286 | 3/1975 | Putman | 364/464 |
| 3,984,699 | 7/1975 | Bailey | 307/117 |
| 4,081,691 | 3/1978 | Evalds | 307/117 |
| 4,100,428 | 7/1978 | Delisle | 307/126 |

Primary Examiner—L. T. Hix
Assistant Examiner—Stafford D. Schreyer
Attorney, Agent, or Firm—Jenkins, Coffey, Hyland, Badger & Conard

[57] ABSTRACT

A system for allocating energy adapted to be coupled to a plurality of conditioning equipment systems utilized to alter a plurality of corresponding first conditions. Thermal sensors for monitoring the conditions in each of a plurality of environments are coupled to allocation circuitry which provides for activation of control channels of the allocation circuitry in an order determined by the relative demand for conditioning of the plurality of environments. When two or more environments are determined to have the same demand for conditioning, the control channels of the allocation circuitry are activated in a controlled order. When a predetermined number of control channels have been activated, the process of allocation is terminated by the allocation circuitry. When more than the predetermined number of control channels is activated in case of a failure of the system, an alarm is activated and all previously activated control channels are deactivated. The allocation circuitry also provides for energization of only one of the plurality of conditioning equipment systems at a time after a power failure or if two or more channels of the allocation circuitry are activated during a given time interval.

28 Claims, 10 Drawing Figures

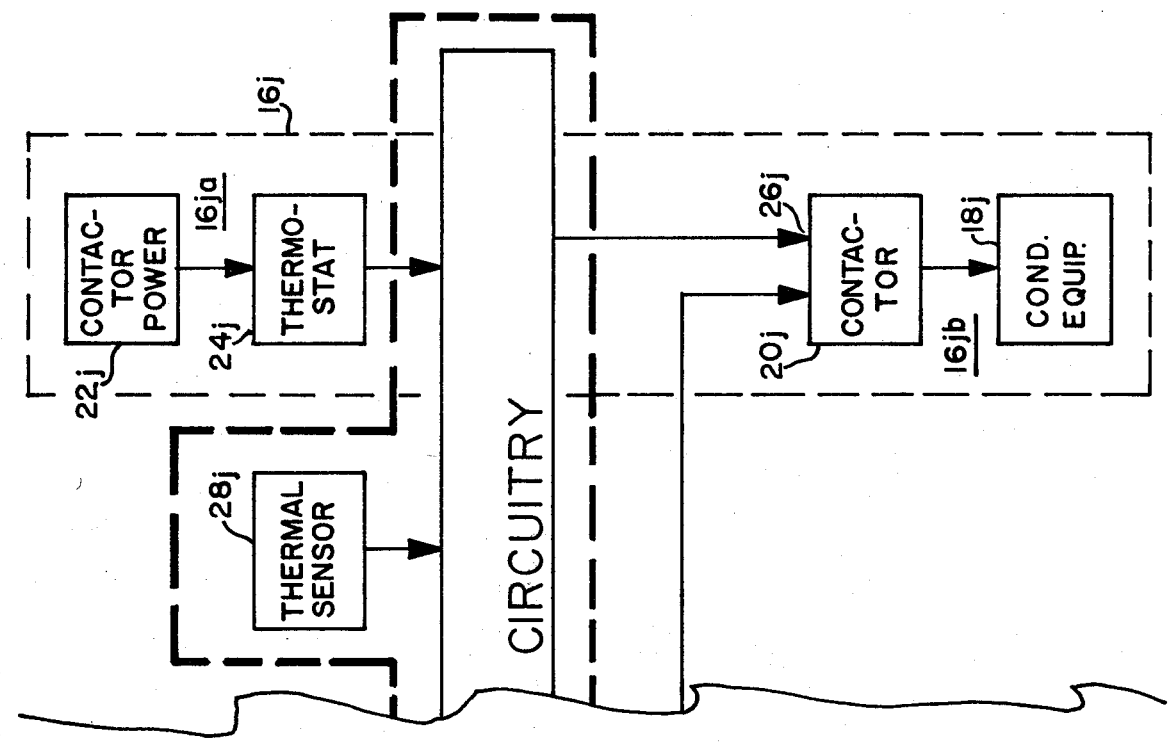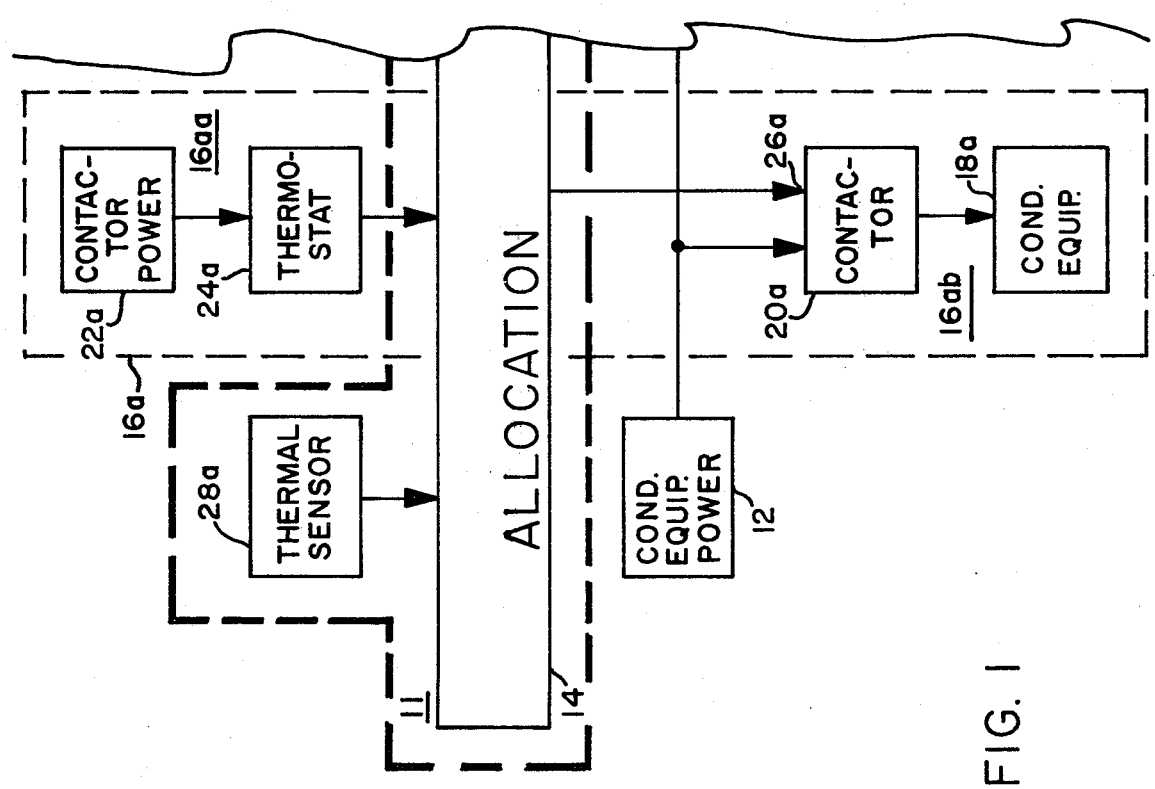
FIG. I

ENERGY ALLOCATOR

This appln. is a C-I-P of Ser. No. 841,840, filed Oct. 13, 1977.

This invention relates to a system for allocating energy to a predetermined number of a plurality of conditioning equipment systems to provide for conditioning of a corresponding number of a plurality of environments having the greatest demand for conditioning.

Recently there has been a great amount of concern throughout the world about our rapidly dwindling sources of certain kinds of energy. Governments of most of the major countries have appealed to industry and individual customers to be mindful of the energy they use, and to conserve energy whenever possible. Various governmental agencies have been given responsibility for determining ways to conserve energy and various methods have been developed to monitor energy consumption. Additional charges have been imposed upon those who have continued to consume abnormally high amounts of energy. The additional charges have been branded by companies supplying electric power as "demand charges".

If abnormally high amounts of electrical energy are consumed for a short duration of time, electric power companies must provide extra equipment and maintain a reserve energy capacity in order to meet the short duration energy demands. If these abnormal energy consumption situations could be eliminated, electric power generating companies could reduce expenditures on power generating equipment and also save energy.

Various electrical systems have been developed and marketed to avoid the aforementioned short duration, high energy consumption and thereby eliminate the associated demand charges. One such system is called a "load shedder". The load shedder is a system which monitors the peak load placed on the power lines by a user of electric power and turns off certain predetermined loads in a preset, pre-programmed order, when the peak load begins to exceed a predetermined maximum which is programmed into the load shedder system.

If there is an adequate mix of types of loads, the load shedder system seems to work reasonably well since in these situations certain types of non-critical loads can be turned off during certain intervals and not adversely affect the operation of the power user's facilities. If, however, there is not an adequate mix of types of loads, a preset, pre-programmed order of shedding of the loads seems not to be a feasible way of accomplishing an avoidance of demand charges.

A more desirable choice of determining loads to be energized, versus loads to be shed, appears to be based on a system of frequent analysis of the relative demand requirements for each of the various loads. In this type of system, only those loads which are in the greatest demand, at any one time, would be provided energy. The aforementioned system has one of its greatest applications in a situation where the only substantial loads which the user of electricity is willing to sacrifice is air conditioning equipment, which includes both heating and cooling equipment.

In addition to having a system which will energize or shed loads in an acceptable manner, it is also desirable to have a system, for controlling power demand, which is relatively inexpensive to install and interconnect with already existing control equipment in a power user's facilities.

In accordance with the invention, a system for allocating energy, adapted to be coupled to a plurality of conditioning equipment systems each altering a corresponding one of a plurality of first conditions in response to a corresponding one of a plurality of first signals, includes a first means for developing, in the absence of a second signal, a plurality of third signals in an order determined by the relative deviation of each of the plurality of corresponding first conditions from each of a plurality of corresponding predetermined second conditions; and for developing, in the absence of the second signal and in a controlled order, those of the plurality of the third signals identifying those of the plurality of corresponding first conditions having substantially the same deviation from corresponding ones of the plurality of predetermined second conditions and for developing a fourth signal in response to the second signal. Second means is coupled to the first means for developing a second signal when a predetermined number of the third signals is developed by the first means. Third means is coupled to the first means and adapted to be coupled to the plurality of conditioning equipment systems, for developing, in response to the fourth signal, the plurality of first signals corresponding to the third signals developed, in the absence of the second signal by the first means.

Further according to the invention, a conditioning equipment control system includes a power source, a plurality of switches, and a plurality of conditioning equipment units, each unit for altering a variable in a respective one of a plurality of selected environments for locales, with each conditioning equipment system being coupled through a respective one of the switches to the power source for operation. Each of the conditioning equipment units has a predetermined, known power demand. The system further includes means for generating a first signal corresponding to a desired value for the variable in a respective environment or locale, means for generating a second signal corresponding to an actual value for the variable in a respective environment or locale, and means for comparing the first and second signals and for closing various ones of the switches in response to such comparison. The switches are closed in a controlled order determined by the differences between the respective desired values and actual values. Means are provided for generating weight signals corresponding to each of said power demands. Further means are provided for combining the weight signals related to the power demands of the various units whose switches are closed. A peak demand reference signal generator generates a signal corresponding to the maximum demand which a user wishes to place on the power source. Means are provided for generating a disabling signal when the combined weight signals achieve a predetermined relation, illustratively, equality, to the peak demand reference signal, to prevent use of power from the power source in excess of said peak demand.

Additionally, it should be noted that, instead of a plurality of conditioning equipment units each altering the same variable, e.g., temperature, humidity, or some other variable, in each of a plurality of selected environments or locales, the plurality of conditioning equipment units could alter a plurality of variables in a single locale, or in a plurality of locales. For example, one of the conditioning equipment units could control temperature in a particular locale. Another of such conditioning equipment units could control humidity in the same locale. A third such conditioning equipment unit could control lighting in the same locale. A fourth such conditioning equipment unit could control a fourth variable in the same locale, and so on. According to this concept, the conditioning equipment control system would include a power source, a plurality of switches, and a plurality of conditioning equipment units, each altering one of a plurality of variables in at least one environment or locale, with each conditioning equipment unit being coupled through a respective one of such switches to the power source for operation thereby, and each of the conditioning equipment units having a predetermined, known power demand. A plurality of means are provided, each of which means generates a first signal corresponding to a desired value for a selected one of said variables in the environment or locale. A second plurality of means, each of which generates a second signal corresponding to an actual value for a respective one of said variables in said environment or locale, is provided. Means are provided for comparing the respective first and second signals and for closing various ones of said switches in response to such comparison. The switches are closed in a controlled order determined by the differences between the respective desired and actual values. Means are provided for generating weight signals related to each of the power demands, and means are provided for combining the weight signals related to the power demands of the various units whose switches are closed. Additional means generates a maximum demand reference signal, and further means generates a disabling signal when the combined weight signals achieve a predetermined relation, illustratively equality, to the maximum demand reference signal to prevent use of power from the power source in excess of the maximum demand.

A more detailed description of the preferred embodiment of the invention is given in the following detailed description and the accompanying drawings of which:

FIG. 1 illustrates, in block form, an energy allocator system coupled to a plurality of conditioning equipment systems;

Figure 2A:
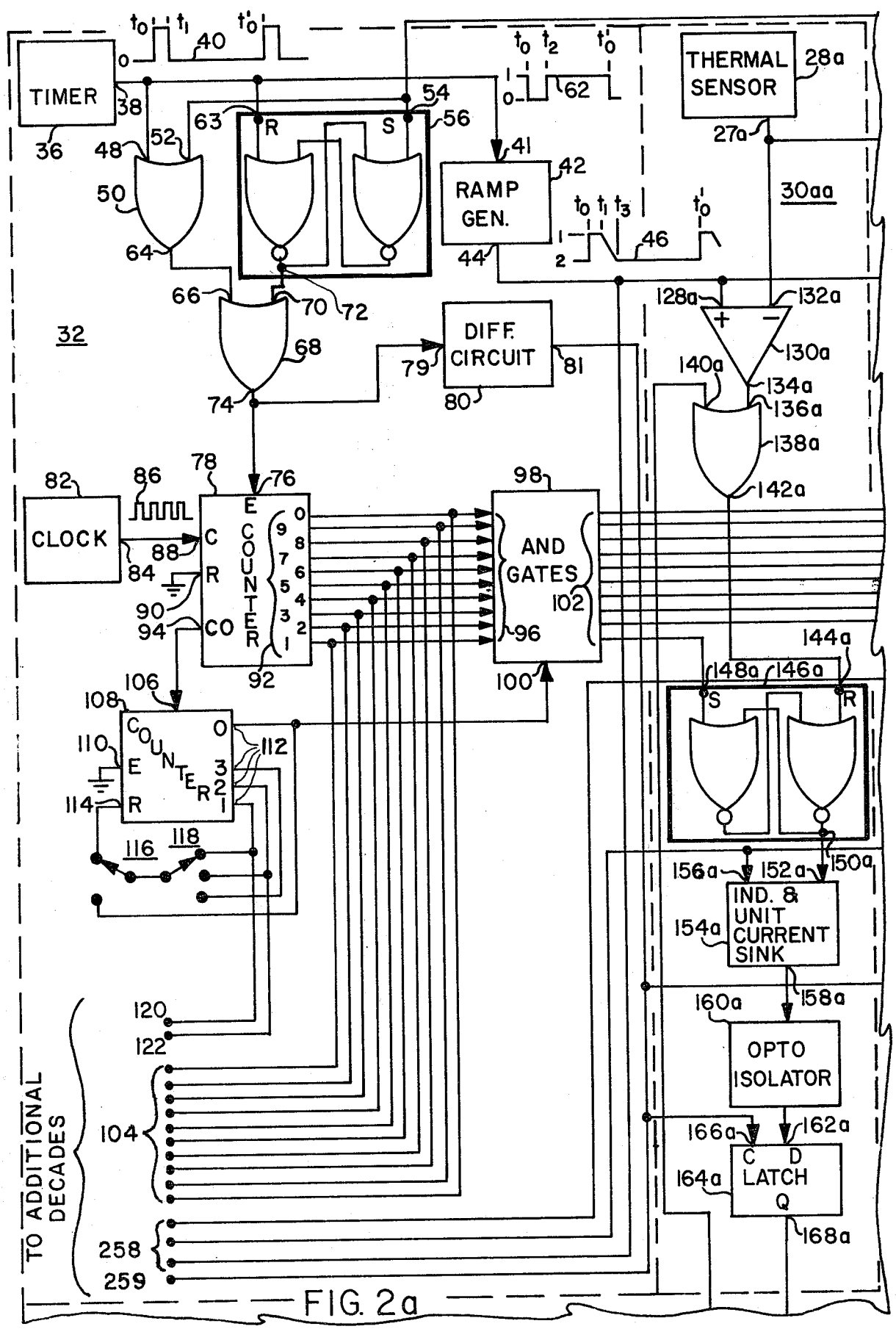
FIGS. 2a–2e illustrates, in block form, a more detailed version of an energy allocator system coupled to a plurality of conditioning equipment systems as shown in FIG. 1.
Figure 2B:
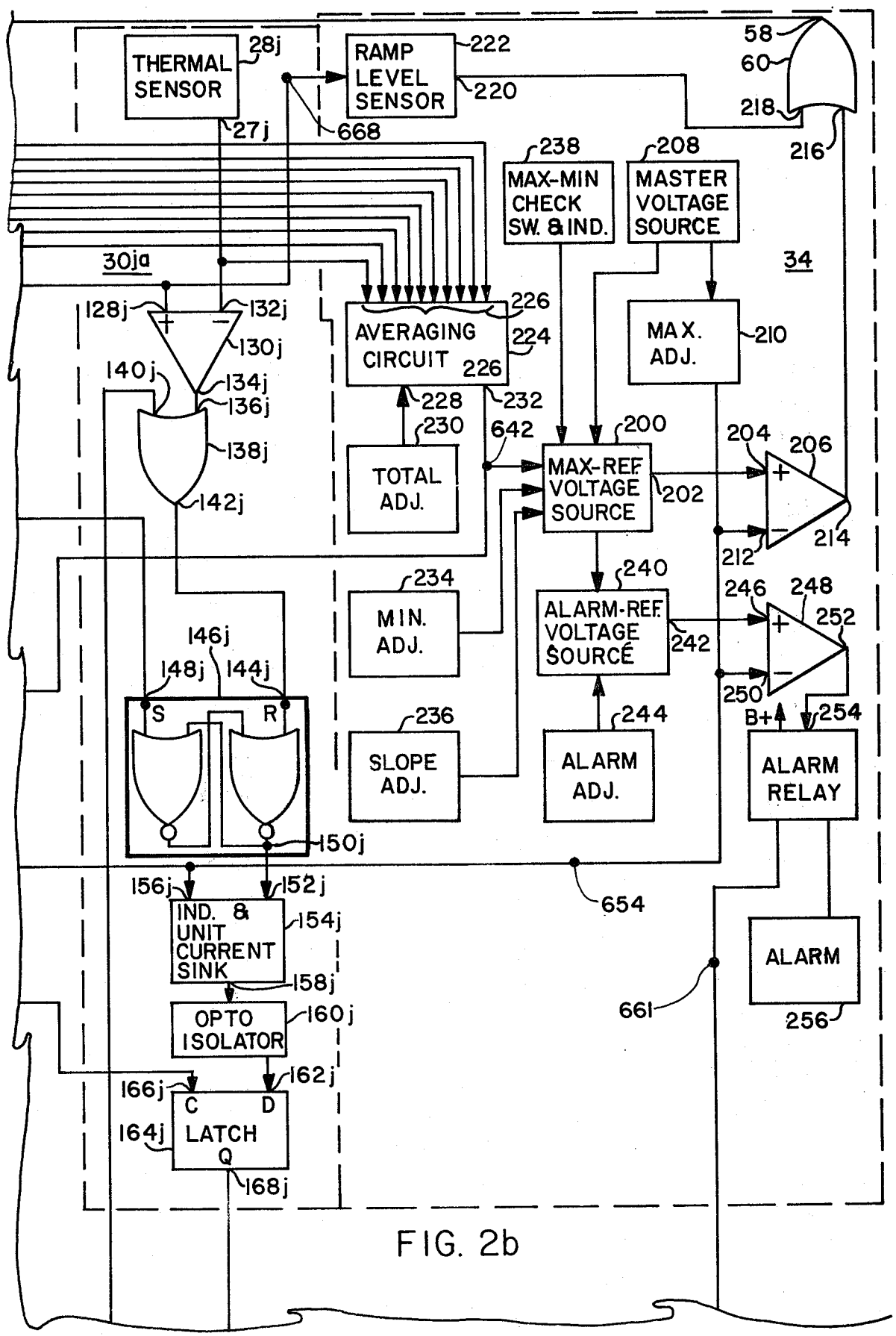
Figure 2C:
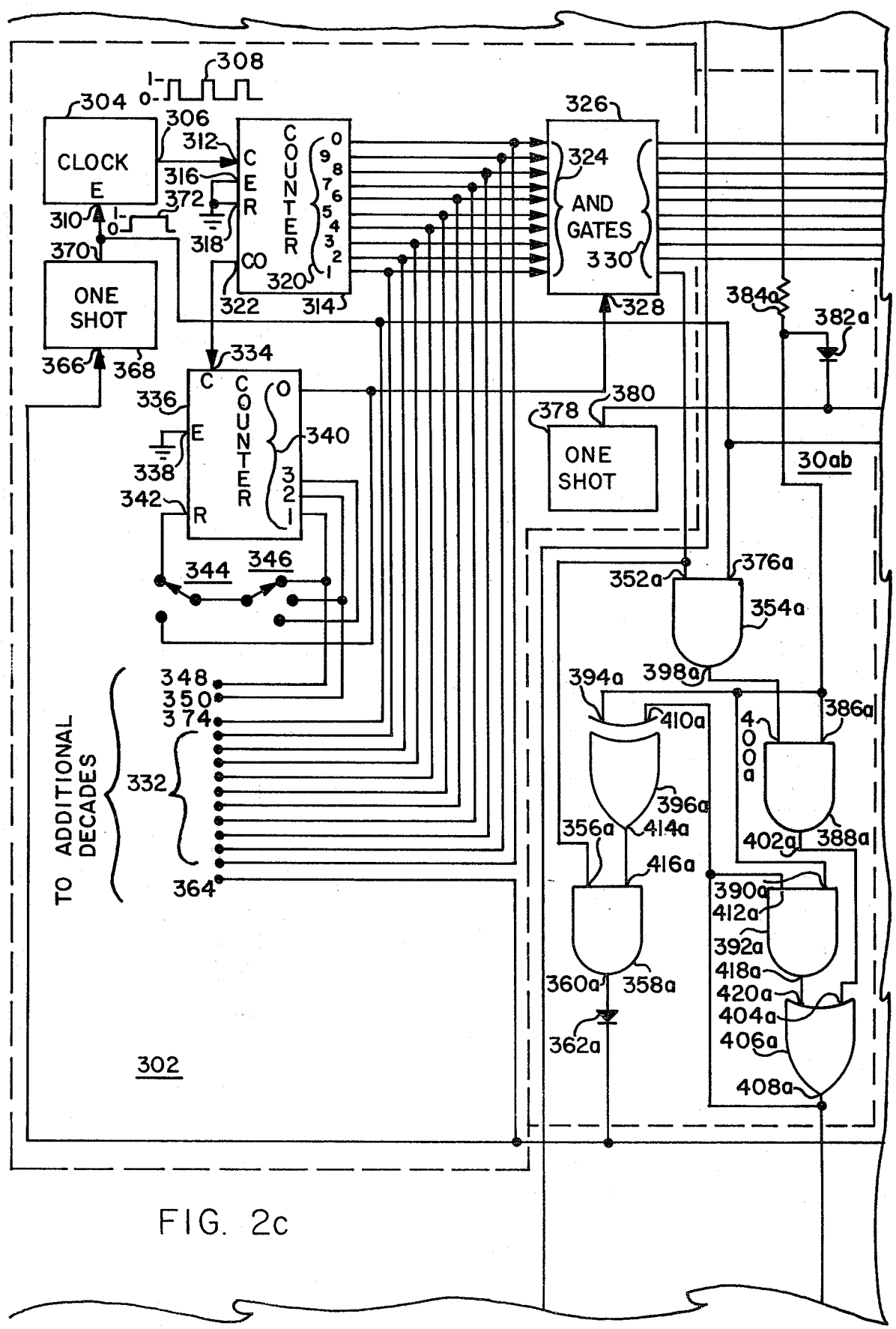
Figure 2D:
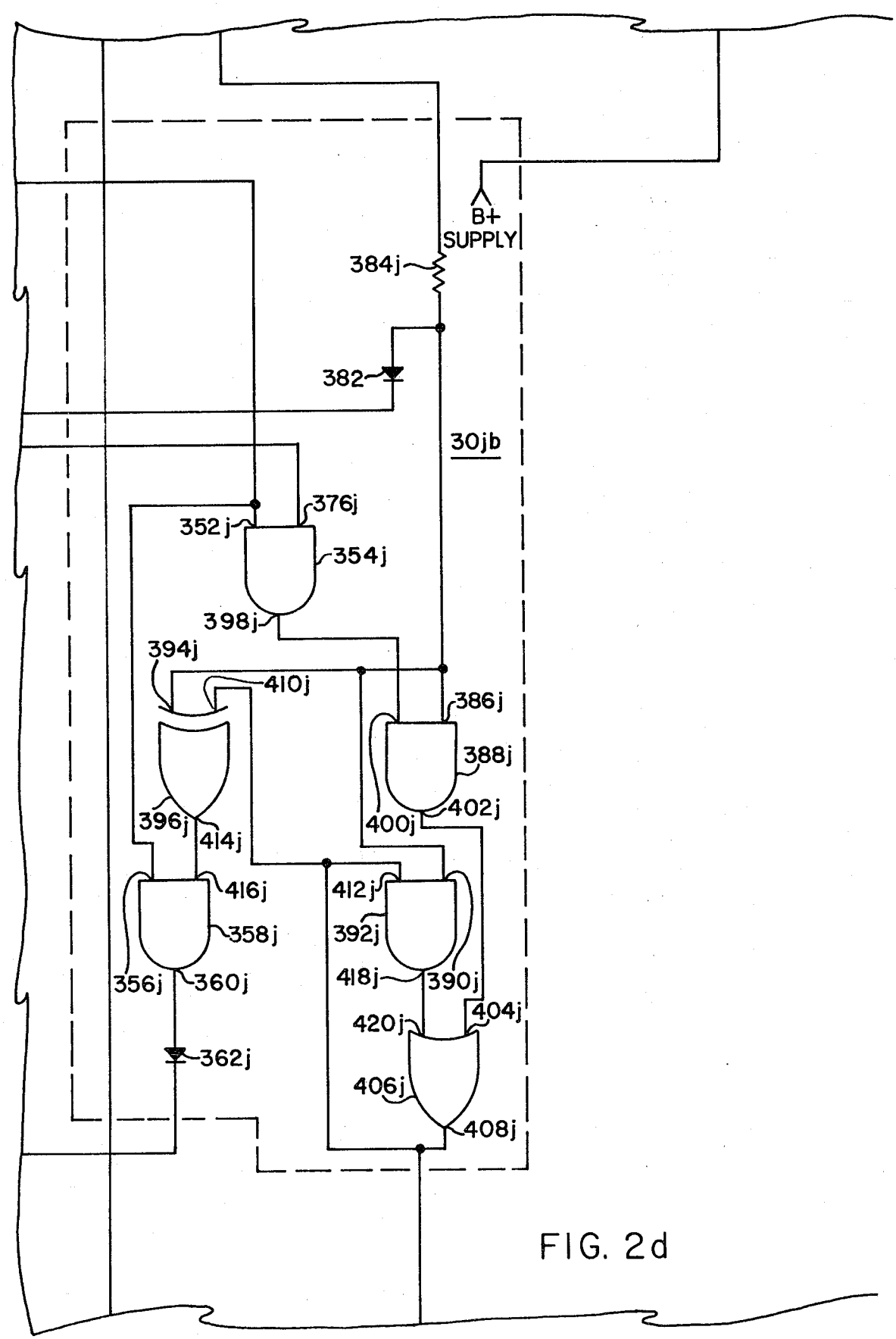
Figure 2E:
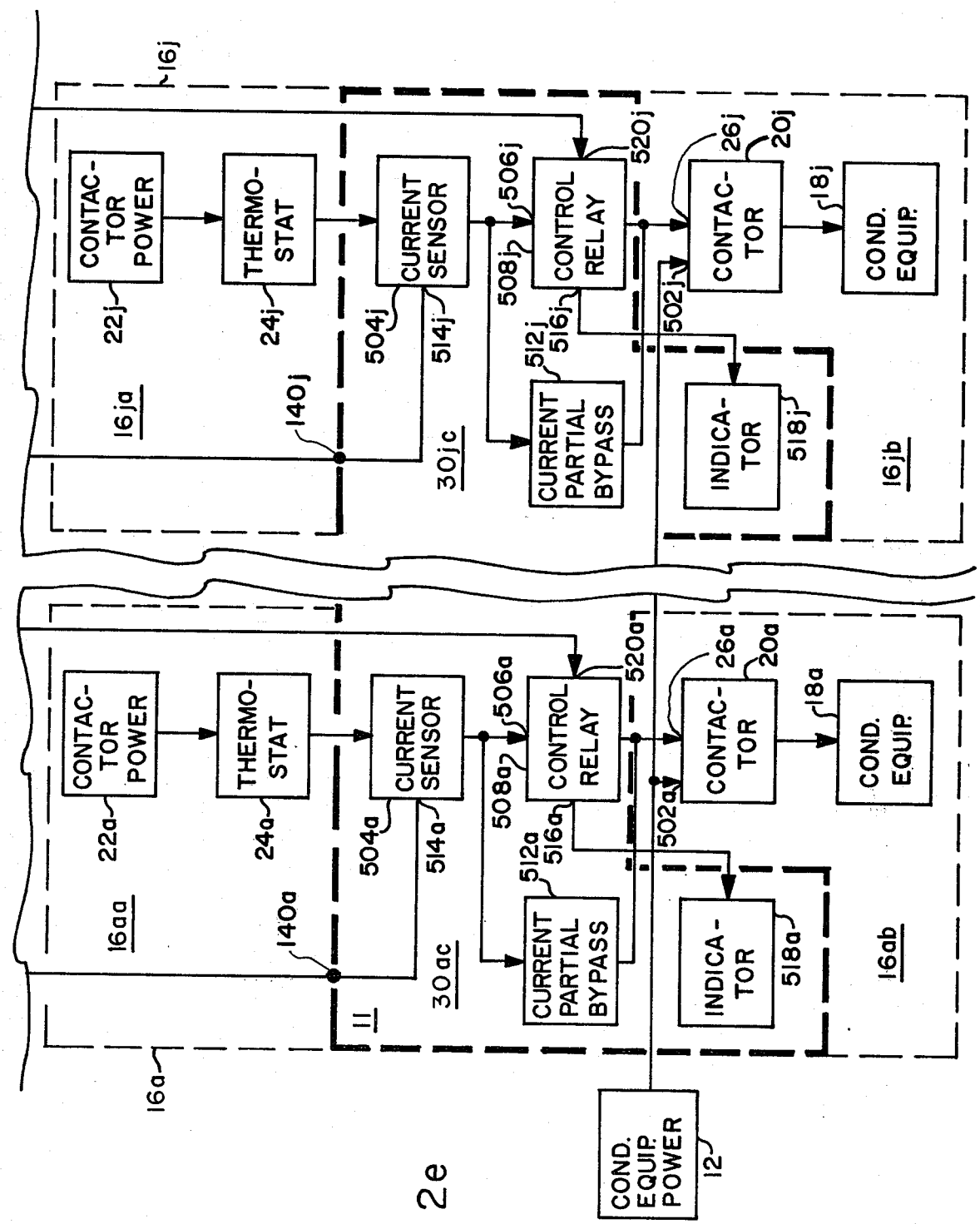
Figure 3:
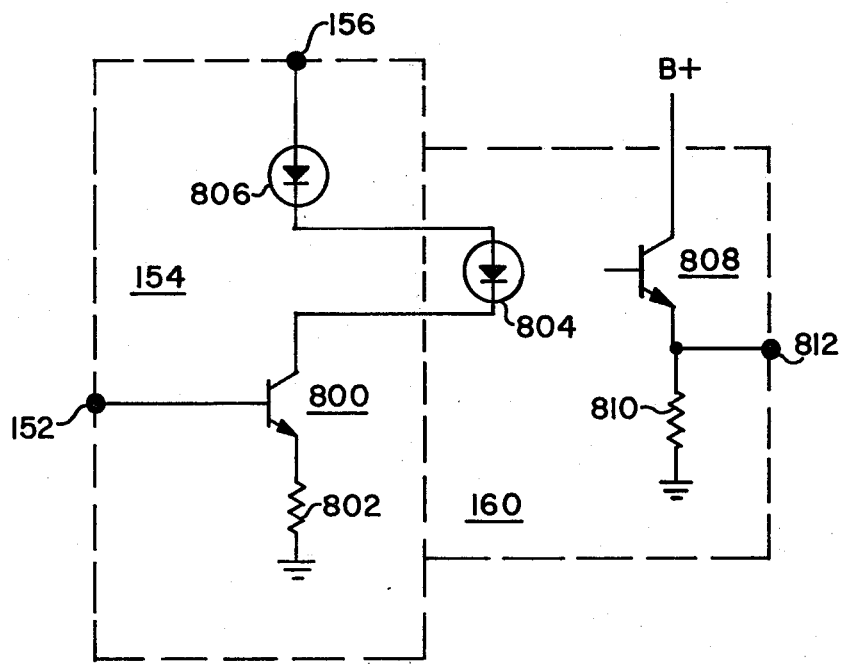
Figure 4:
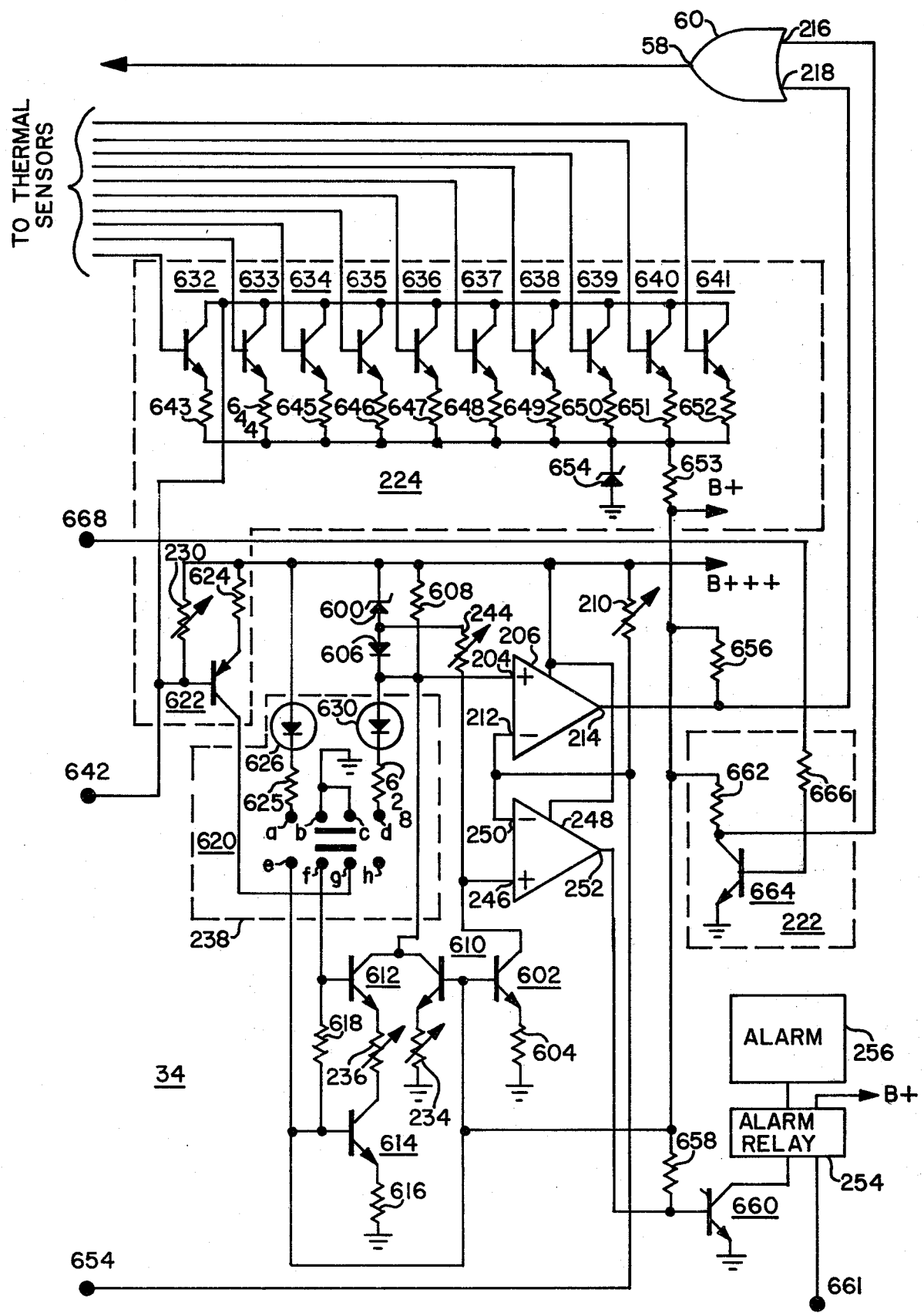
Figure 5:
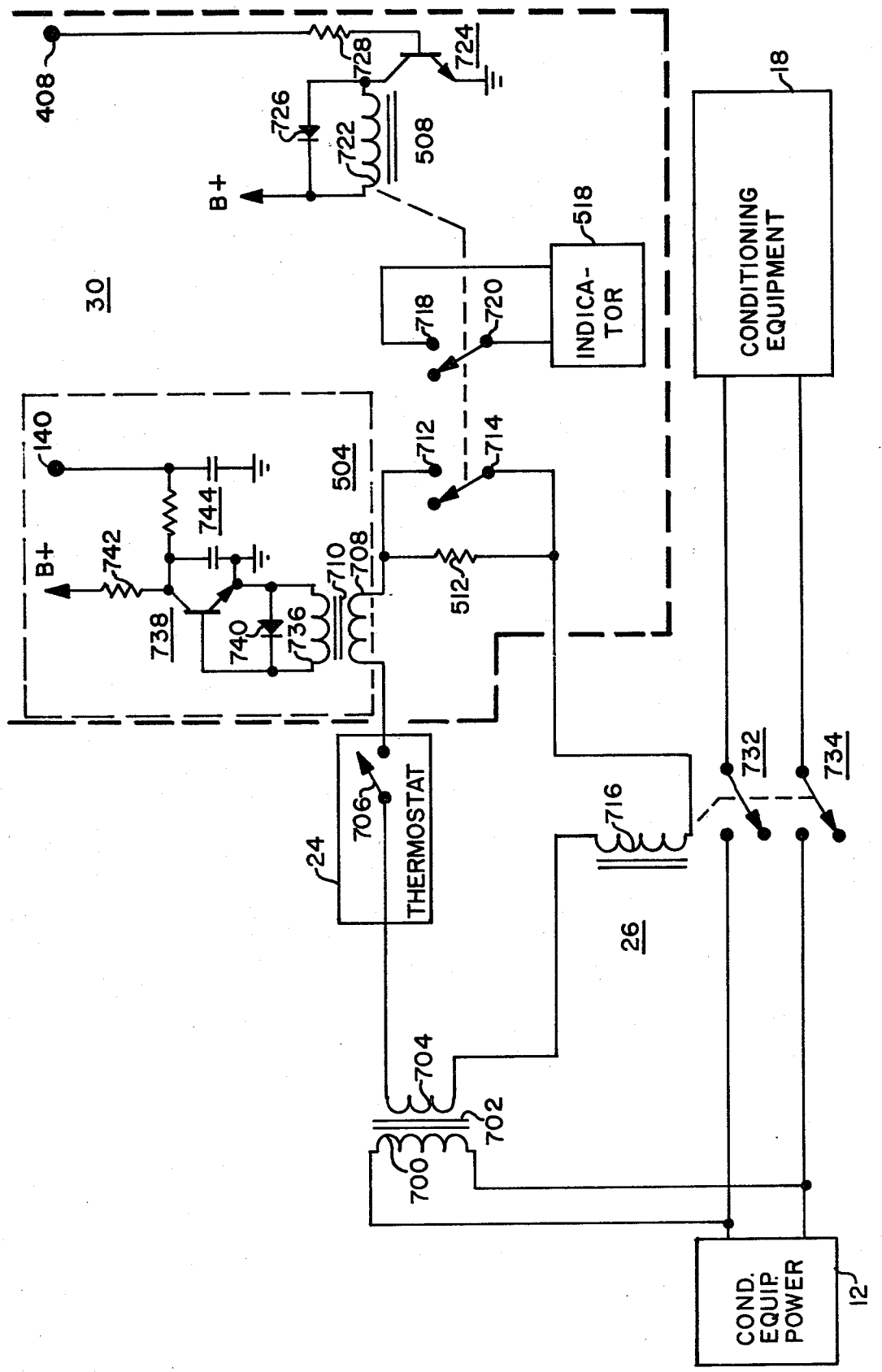
Figure 6:
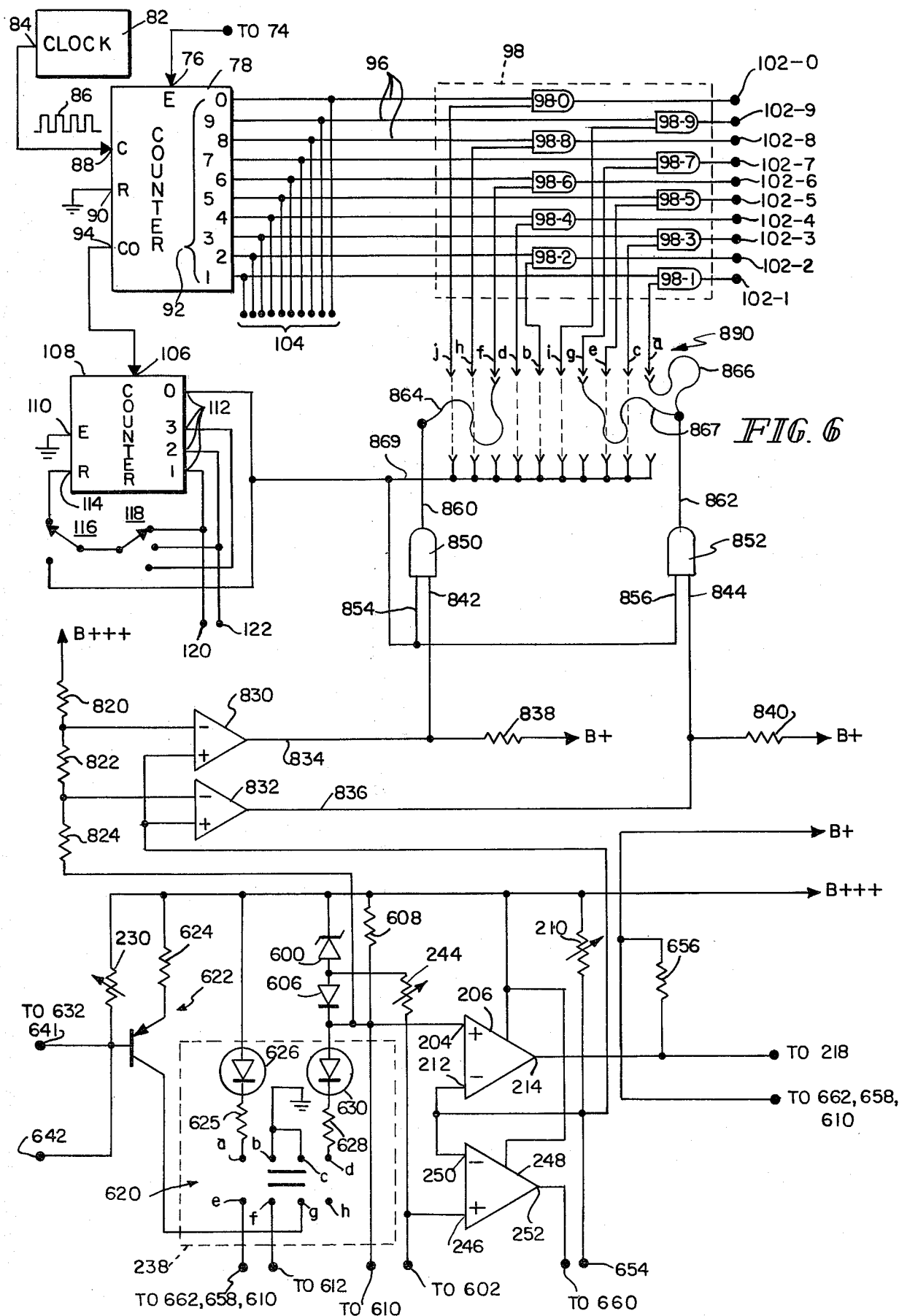

FIG. 3 illustrates in schematic form a more detailed version of the indicator and unit current sink 154 and optoisolator 160 shown in FIGS. 2a and 2b;

FIG. 4 illustrates, in block and schematic form, a more detailed version of the portion of the block diagram shown in FIG. 2b and identified as item 34;

FIG. 5 illustrates, in block and schematic form, a more detailed version of one of the conditioning equipment systems connected to a portion of the energy allocator system as illustrated in block form in FIG. 2e; and FIG. 6 illustrates, in block and schematic form, an addition to the energy allocator system illustrated in FIGS. 2a–2e, to incorporate into the system a scheme for dealing with another variable which exists in many conditioning equipment systems.

In FIG. 1, an energy allocator 11 includes allocation circuitry 14 and thermal sensors 28a thru 28j. The energy allocator system 11 is coupled between sections 16aa and 16ab and between sections 16ja and 16jb of conditioning equipment systems 16a and 16j, respectively. The elements shown to be a part of conditioning equipment systems 16a and 16j are the essential elements of each conditioning equipment system. Even though the number of conditioning equipment systems which may be accommodated by any given energy allocator system 11 may be less than, equal to, or greater than ten, the energy allocator system 11 will be explained considering a complement of ten conditioning equipment systems (i.e., 16a thru 16j). Since conditioning equipment systems 16a and 16j are of equal element complement and are identical to the other eight conditioning equipment systems (not shown), only conditioning equipment system 16a will be described in detail. Also, although the energy allocator system 11 may be utilized to control conditioning equipment systems which are designed for heating or cooling a particular environment or other types of environmental conditioning, the energy allocator system 11 will be described in terms of conditioning equipment systems which provide cooling.

The conditioning equipment power 12 is coupled to a piece of conditioning equipment 18a by means of a set of contacts (not shown) of a contactor 20a. A contactor power source 22a is coupled through a switch (not shown) of a thermostat 24a and the allocation circuitry 14 to terminal 26a of contactor 20a, thereby providing a source of power for energizing the contactor 20a when the thermostat 24a is calling for cooling and the allocation circuitry 14 has determined that the conditioning equipment 18a is to be energized. The energizing of contactor 20a causes the contacts (not shown) of contactor 28a to be closed and conditioning equipment 18a to be energized.

The thermal sensor 28a coupled to the allocation circuitry 14 develops a signal which is proportional to the difference between the temperature in the environment in which thermal sensor 28a is placed (hereinafter referred to as "control point") and the temperature setting selected on the thermal sensor 28a (hereinafter referred to as "set point"). The relative levels of the signals produced by the thermal sensors 28a thru 28j are analyzed by the allocation circuitry 14. The thermal sensor indicating the greatest need for conditioning of its environment (i.e., greatest difference between "control point" and "set point") is considered first in the allocation of energy to the conditioning equipment 18a thru 18j in the various corresponding environments.

If two or more of the thermal sensors 28a thru 28j are producing substantially the same level of signal, these thermal sensors are considered in a controlled order in determining how to allocate energy to the conditioning equipment 18a thru 18j in the various corresponding environments.

The absolute maximum number of pieces of conditioning equipment 18a thru 18j which can be energized by conditioning equipment power 12 is also established by the allocation circuitry 14. By establishing the maximum number of conditioning equipment systems to be energized, the maximum power demand is established by allocation circuitry 14. In addition, the energy allocator system provides for what is called "proportional control". That is, the greater the average deviation between the "set point" and the "control point" of all the thermal sensors 28a thru 28j, the greater the number of pieces of conditioning equipment 18a thru 18j which can be energized by the conditioning equipment power 12.

Allocation circuitry 14 also provides for the initial energization of only one piece of conditioning equipment at a time from the equipment power 12 (i.e., staging) when there is an interruption of the conditioning equipment power 12 or when two or more pieces of conditioning equipment 18a thru 18j are selected to be allocated energy by the energy allocator system 11 during a given time interval.

In FIGS. 2a-2e, the energy allocator system 11 shown in FIG. 1 will be described in considerably greater detail. FIGS. 2a-2e were necessary due to the large amount of circuitry to be described in conjunction with the energy allocator system 11. However, to simplify the explanation of FIGS. 2a-2e, the figs. will be considered as follows: FIGS. 2a and 2b will be considered together and FIGS. 2c and 2d will be considered together and then FIG. 2e will be considered. Also to simplify the explanation whenever possible, only one channel of the energy allocator system 11 will be described in detail. It should also be realized that the energy allocator system 11 shown in FIGS. 2a-2e can be coupled to additional slave decades (ten control channel units similar to those shown in FIGS. 2a-2e) to accommodate a total of more than ten control channels in the allocator system 11.

In FIGS. 2a-2b, only two control channels are illustrated and enclosed by dotted lines and these control channels are identified as 30aa and 30ja. Although only two control channels are illustrated in detail, the energy allocator system 11 actually includes ten control channels (i.e., 30a thru 30j).

In addition to the individual control channel circuitry identified as 30aa and 30ja, circuits common to all control channels of the energy allocator system 11 are enclosed by dotted lines and identified as 32 and 34. The circuity identified as 32 is that portion of the energy allocator system 11 which provides for developing a plurality of signals to be used to activate the various control channels 30aa thru 30ja which in turn provides for energization of conditioning equipment coupled thereto, thus providing for conditioning of environments having the greatest need for conditioning. Also, circuitry 32 provides for activation, in a controlled order, of those control channels corresponding to thermal sensors indicating substantially the same deviation between "control point" and "set point". The circuitry 32 also provides signals to be used to activate control channels in the aforesaid slave decades (not shown).

The circuitry enclosed by dotted lines and identified as 34 develops a signal when a predetermined number of control channels 30aa thru 30ja are activated. The signal developed by circuitry 34 is coupled to circuitry 32 and thus provides for the termination of the activation of channels by circuitry 32 when a predetermined number of control channels have been activated.

Also, circuitry 34 provides for alteration of the predetermined number of control channels activated before circuitry 34 terminates the activation of control channels, thereby providing for "proportional control". The alteration of this predetermined number of activated control channels is derived from averaging the output signals of the thermal sensors 28a thru 28j.

One additional feature of circuitry 34 is that an alarm circuit provides for an alarm and a deactivation of all control channels 30aa thru 30ja when the number of activated control channels exceeds the predetermined number established by circuitry 34.

The circuitry 32 includes a timer 36 which produces a signal at an output terminal 38 which has a waveform 40. During the interval T0-T1, which is the "reset interval", the signal at output terminal 38 is at a logic "1" level. During the interval T1-T0', which is the "timing interval", signal at an output terminal 38 is at a logic "0" level. The output terminal 38 is coupled to a reset terminal 41 of a ramp generator 42. A signal is produced at an output terminal 44 of ramp generator 42 which has a waveform 46. During the interval T0-T1, the signal at output terminal 44 is reset to a first voltage level. During the interval T1-T3, which is the "sweep interval", the ramp generator 42, in response to the logic "1" level produced at output terminal 38 of timer 36, produces a ramp from the first voltage level to a second voltage level. During the interval T3-T0', the signal at output terminal 44 remains at the second voltage level.

The output terminal 38 of timer 36 is also coupled to a first gate 48 of an OR gate 50. Another gate 52 of OR gate 50 is coupled to a "set" terminal 54 of cross-coupled NOR gates 56 which form an R-S flip-flop. Gate 52 and set terminal 54 are coupled to an output terminal 58 of an OR gate 60 of circuitry 34. The signal produced at output terminal 58 has a waveform 62 which is at a logic "0" during the interval T0-T2 and is at a logic "1" during the interval T2-T0'. T2 is defined as the point at which the number of control channels 30a thru 30j, which have been activated, is equal to the predetermined number of control channels to be activated as determined by circuitry 34. A reset terminal 63 of cross-coupled NOR gates 56 is coupled to terminal 38 of timer 36.

The output terminal 64 of OR gate 50 is coupled to a first gate 66 of OR gate 68. Another gate 70 of OR gate 68 is coupled to the output terminal 72 of cross-coupled NOR gates 56. The output terminal 74 of OR gate 68 is coupled to an "enabling" terminal 76 of counter 78 and also to a differentiating circuit 80.

A clock 82 produces a signal at output terminal 84 having a waveform 86. This signal has a period (e.g., 30 microsec.) which is considerably less than the interval T1-T3 (e.g., 2 sec.) as shown in waveform 46. The output 84 of clock 82 is coupled to a clock input terminal 88 of counter 78. Signal at output terminal 84 provides for clocking of the counter 78 when the signal at terminal 76 is at a logic "0". The reset terminal 90 is coupled to reference potential and allows for normal operation of counter 78 without reset capability. At any time B+ is applied to counter 78, one of a plurality of output terminals 92 is at a logic "1". Each time the signal at terminal 84 makes the transition from a logic "0" to a logic "1", the one of the output terminal 92 which was previously at a logic "1" goes to a logic "0" and the next terminal in numerical order goes from a logic "0" to a logic "1". This process repeats itself each period of the clocking signal at output terminal 84, thereby causing a continuous ripple of logic "1" signals at the output terminals 92, over and over again as long as the signal at terminal 76 is at a logic "0". A carry-out terminal 94 makes a transition from a logic "0" level to a logic "1" level when terminal "0" of output terminals 92 make a transition from a logic "0" level to a logic "1" level, thereby providing a signal which occurs every ten counts of the counter 78.

Each of the output terminals 92 are coupled to one of a plurality of first gates 96 of a plurality of dual input AND gates 98. The second gate of each of the AND gates 98 are all coupled to a common input terminal 100.

Output terminals 102 of AND gates 98 provide signals which are identical to the signals at output terminals 92 of counter 78 when gate terminal 100 is at a logic "1". When the signal at gate terminal 100 is at a logic "0", all of the output terminals 102 are at a logic "0".

The output terminals 92 of counter 78 are also coupled to a plurality of terminals 104 which provide counting pulses to the input terminals of AND gates similar to 98 which are used to provide counting pulses to additional slave decades of control channels (not shown).

Terminal 94 of counter 78 is coupled to a clock terminal 106 of a multiplying counter 108. The enabling terminal 110 of counter 108 is coupled to reference potential and provides for a continual response of a plurality of output terminals 112 to clock pulses occurring at clock terminal 106. The reset terminal 114 is coupled as shown through a switch 116 and another switch 118 to one of the output terminals 112 identified as "1". Another one of the output terminals 112 identified as "0" is coupled to the gate terminal 100 of AND gate 98 and to another terminal of switch 116. Connected in this manner, when the signal at the output terminal identified as "0" is at a logic "1", the AND gates 98 reproduce at output terminals 102 the signals developed at output terminals 92 of counter 78. After the counter 78 has completed one decade of counting, the terminal identified as "0" of counter 108 changes from a logic "1" to a logic "0" and the output terminal idenfitied as "1" changes from a logic "0" to a logic "1". When the terminal identified as "1" of counter 108 changes to a logic "1", the reset terminal 114 changes to a logic "1" and resets counter 108, thereby reinstating a logic "1" at the terminal identified as "0" of counter 108. Therefore, with each succeeding decade of counting of counter 78 the signals at output terminals 92 are reproduced at terminals 102 of AND gates 98.

When additional decades are coupled to terminals 104, the first decade of AND gates similar to 98 (not shown) has its common gate similar to terminal 100 coupled to terminal 120. If a second decade of AND gates similar to 98 (not shown) are coupled to terminals 104, the common gate similar to 100 is coupled to terminal 122.

When only one additional decade of AND gates (not shown) is coupled to terminals 104, the switch 118 is switched so that the reset terminal 114 is coupled to the output terminal identified as "2" of counter 108. Coupled in this manner, the first decade of counting of counter 78 produces signals at output terminals 102 of AND gates 98 which are the same as the signals produced at output terminals 92 of counter 78. At the end of the first decade of counting, a positive pulse is produced at terminal 94 of counter 78 which results in a logic "0" at the output terminal identified as "0" of counter 108 and a logic "1" at output terminal identified as "1" of counter 108. When output terminal idenified as "1" is at a logic "1", terminal 120 is at a logic "1" and the common gate of the first additional decade of AND gates similar to 98 is at a logic "1", thereby producing counting signals at the output terminals of the first additional decade of AND gates, which is the same as the signals produced at output terminals 92 of counter 78. If a second decade of additional AND gates similar to 98 is coupled to terminals 104, switch 118 is positioned such that the reset terminal 114 is coupled to output terminal identified as "3" of counter 108. Thus, by utilizing the switch 118, it is possible to utilize the counter 78 to provide counting pulses to additional slave decades and thereby expand the total number of channels which the energy allocator system can accommodate. Although the system illustrates means for providing up to three decades of control channels, it can be readily seen that more than three decades can be provided for in the system.

The switch 116 may be positioned such that the output terminals of counter 108 are coupled to the common gate terminal 100 of AND gates 98. By providing switch 116, it is possible to utilize printed circuit boards designed for circuits shown in FIGS. 2a and 2b for additional slave decades by leaving certain components off the master printed circuit board.

The following description of the interconnection between the circuitry 32 and channels 30aa thur 30ja and the interconnection of components within a channel will be described in terms of a single channel in order to simplify the overall explanation.

The output terminal 44 of ramp generator 42 is coupled to each of the positive terminals 128a thru 128j of comparators 130a thru 130j of channels 30aa thru 30ja. The output terminals 27a thru 27j of thermal sensors 28a thru 28j are coupled to corresponding negative terminals 132a thru 132j of comparators 130a thru 130j, respectively. Since the range of signals produced by the thermal sensors 28a thru 28j is within the range of voltage produced by the ramp generator 42 at terminal 44, the output terminals 134a thru 134j of comparators 130a thru 130j are at a logic "1" level when the signal at output terminal 44 is at the first voltage level. However, during the interval T1-T3, as the signal at the output terminal 44 of ramp generator 42 drops below the voltage at one of the terminals 132a thru 132j of comparators 130a thru 130j, the corresponding output terminals go from a logic "1" level to a logic "0".

The output terminal 134a is coupled to a first input gate 136a of OR gate 138a. The other gate 140a of OR gate 138a is coupled to circuitry in FIG. 2e, and in order to simplify the explanation of FIGS. 2a and 2b, this terminal will be assumed to be at a logic "0".

The output terminal 142a of OR gate 138a is coupled to "reset" terminal 144a of cross-coupled NOR gate 146a which forms an R-S flip-flop. The "set" terminal 148a of cross-coupled NOR gate 146a is coupled to one of the plurality of output terminals 102 of AND gates 98.

The output terminal 150a is coupled to control terminal 152a of indicator and unit current sink 154a. With a logic "1" at input terminal 152a, the indicator and unit current sink 154a causes a predetermined amount of current to flow into input terminal 156a.

Output terminal 158a of indicator and unit current sink 154a is coupled through an optoisolator 160a to "data" terminal 162a of latch 164a. "Clock" terminal 166a of latch 164a is coupled to the output terminal 81 of differentiating circuit 80. The latch 164a produces a logic level at output terminal 168a which is equal to the logic level at data terminal 162a when the signal produced at terminal 81 of differentiator circuit 80 is at a logic "1" level and the level at terminal 168a is retained by latch 164a independent of subsequent changes of data at terminal 162a when the logic level at terminal 166a changes to a logic "0" level.

Circuity 34 of FIG. 2b provides for the activation of a predetermined number of control channels 30aa thru 30ja during any time interval. The heart of circuitry 34 is a maximum reference voltage source 200. The reference voltage source 2100 produces a voltage at an output terminal 202 which is coupled to the plus terminal 204 of a maximum comparator 206. A master voltage source 208 is coupled through a maximum adjustment 210 to the negative terminal 212 of comparator 206 and to input terminals 156a thru 156j of indicator and current sinks 154a thru 154j. As each of the plurality of channels 30aa thru 30ja is activated, a predetermined amount of current (i.e., one unit) begins to flow into a corresponding one of the terminals 156a thru 156j. The number of control channels which have been activated determines the total current through the maximum adjustment 210, thereby determining the voltage at terminal 212 of comparator 206.

Since the voltage at terminal 202 of voltage source 200 is a fixed voltage below the master voltage source 208, without any of the control channels 30a thru 30ja activated, the voltage at terminal 204 of comparator 206 is less than the voltage at terminal 212 of comparator 206. Thus, without any control channels 30aa thru 30ja activated, the output terminal 214 of comparator 206 is at a logic "0". The output terminal 214 of comparator 206 is coupled to a first gate 216 of dual input OR gate 60 and a second gate 218 is coupled to an output terminal 220 of a ramp level sensor 222. As various ones of control channels 30aa thru 30ja are activated, the voltage at terminal 212 of comparator 206 decreases. When the voltage at terminal 212 is less than the voltage at terminal 204 of comparator 206, the output of comparator 206 changes from a logic "0" to a logic "1" and gate 216 of OR gate 60 goes to a logic "1".

If the reference voltage source 200 produces a constant voltage, a fixed number of control channels 30aa thru 30ja must be activated before the output of comparator 206 goes to a logic "1" level. If, however, the voltage at output terminal 202 of voltage reference source 200 is made to change by sampling certain allocator system conditions, the number of control channels activated prior to the output of comparator 206 going to a logic "1" level can be varied.

The averaging circuitry 224 has a plurality of input terminals 226 each coupled to one of the output terminals 27a thru 27j of thermal sensors 28a thru 28j and a terminal 228 coupled to a total adjustment 230. The averaging circuitry 224, operating in conjunction with total adjustment 230, produces a signal at output terminal 232 which is a function of the average signal produced by thermal sensors 28a thru 28j. The total adjustment 230 is necessary to properly compensate for the total number of utilized channels which could be as few as two channels and as many as thirty channels in this particular system design.

The output terminal 232 is coupled to the reference voltage source 200 and provides for the adjustment of the voltage at output terminal 202 in proportion to the average signal produced by the thermal sensors 28a thru 28j. For example, if the average signal produced by the thermal sensors indicated a need for a large number of control channels to be activated to attain proper conditioning of the environments wherein the energy allocator system is to be used, the voltage produced at output terminal 202 of voltage source 200 would decrease, thereby making it necessary for more control channels 30aa thru 30ja to be activated before the output terminal 214 of comparator 206 goes to a logic "1".

In order to establish a minimum number of channels 30aa thru 30ja which may be activated by the energy allocating system, a minimum adjustment 234 is coupled to voltage source 200 and establishes the maximum voltage which can be produced at output terminal 202 of voltage source 200. Therefore, the minimum adjustment 234 provides for a minimum number of control channels to be activated by the energy allocator system.

A slope adjustment 236 is also coupled to the voltage source 200 and determines the rate at which the voltage at terminal 202 decreases from a voltage established by the minimum adjustment 234 to an absolute minimum voltage determined by the voltage source 200 itself in response to the signal produced at terminal 232 of averaging circuitry 224. This system of providing for a change in the number of control channels to be activated in proportion to the average signal produced by the thermal sensors 28a thru 28j is referred to in the temperature and humidity control industry as "proportional control".

In order that the proportional control system be checked, a maximum/minimum check switch and indicator 238 is coupled to the voltage source 200. This switch and indicator 238 provides for the decoupling of the averaging circuitry 224 from the voltage source 200 and establishes the voltage at output terminal 202 of voltage source 200, either at a first level which provides for the activation of a maximum number of control channels or at a second level which provides for the activation of a minimum number of control channels. Therefore, with this switch and indicator 238, it is possible to check the energy allocator system to determine if it is providing proportional control within the range desired.

The voltage source 200 is also coupled to an alarm reference voltage source 240 which produces, at an output terminal 242, a voltage which is less than the voltage produced at the terminal 202 of referenced voltage source 200 and which may be adjusted by alarm adjustment 244. Output terminal 242 of voltage source 240 is coupled to the positive input terminal 246 of comparator 248. The negative terminal 250 of comparator 248 is coupled to the negative terminal 212 of comparator 206. If the number of activated channels 30aa thru 30ja is less than or equal to the maximum determined by the voltage source 200, the voltage at terminal 250 of comparator 248 is greater than the voltage at terminal 246, therefore the signal at output terminal 252 of comparator 248 is at a logic "0". If the number of activated control channels 30aa thru 30ja is greater than the predetermined number determined by the voltage source 200, the voltage at terminal 246 of comparator 248 is greater than the voltage at terminal 250 and the signal at output terminal 252 of comparator 248 goes to a logic "1".

The output terminal 252 is coupled to an alarm relay 254 which has a first set of normally open contacts (not shown) coupled to an alarm 256 and a second set of normally closed contacts (not shown) which couples B+ to the circuitry of FIGS. 2c and 2d. Connected in this manner, if the number of control channels 30aa thru 30ja activated exceeds the predetermined number determined by the voltage source 200, the alarm 256 alerts those depending upon the energy allocator system 11 of a system malfunction and the alarm relay 254 also disables the circuitry of FIGS. 2c and 2d by decoupling the source of B+ from that circuitry. By disabling the circuitry of FIGS. 2c and 2d, conditioning equipment systems coupled to the energy allocator system are disabled.

Output terminal 44 of ramp generator 42 is coupled to a ramp level sensor 222 which produces a logic "0" at output terminal 220 under all conditions of voltage at terminal 44 except when the voltage at terminal 44 is near to or equal to the second voltage level. Under this condition, the voltage at output terminal 220 of ramp level sensor 222 goes to a logic "1".

Other signals which are required to provide for additional decades of control channels are developed at output terminals 232 of averaging circuit 224; terminal 44 of ramp generator 42; and terminal 81 of differentiating circuit 80 and these terminals are coupled to a plurality of terminals 258 which provide control information to additional decades. Also, a signal derived from additional decades which must be coupled to maximum adjustment 210 is coupled to terminal 259.

In operation at T0− the signal at output terminal 38 of timer 36 is at a logic "0" and gate 52 of OR gate 50 and terminal 54 of flip-flop 56 are at a logic "1". With gate 52 and terminal 54 at a logic "1", gates 66 and 70 of OR gate 68 are both at a logic "1", and enable terminal 76 of counter 78 is also at a logic "1". With terminal 76 at a logic "1" counter 78 is disabled and clock pulses developed at terminal 84 of clock 82 do not affect the logic state at output terminals 92 of counter 78. With the logic state at output terminals 92 of counter 78 remaining constant, the logic state of output terminals 102 of AND gates 98 also remains constant. With the logic state of output terminals 102 of AND gates 98 remaining constant, flip-flops 146a thru 146j of channels 30aa thru 30ja remain unaffected by changes of logic state at terminals 144a thru 144j of flip-flops 146a thru 146j. Therefore, the indicator and unit current sinks 154a thru 154j activated during the last interval when counter 78 was responsive to clock pulses at output terminal 84 of clock 82 remain activated and no additional indicator and unit current sinks 154a thru 154j are being activated.

At T=0 output terminal 38 of timer 36 goes to a logic "1". Therefore, gate 48 of OR gate 50 and terminal 63 of flip-flop 56 also go to a logic "1". With gate 48 at a logic "1" gate 66 of OR gate 68 and enable terminal 76 of counter 78 are also at a logic "1". With a logic "1" on enable terminal 76, counter 78 is disabled. At T0+, gate 52 of OR gate 50 and terminal 54 of flip-flop 56 go to a logic "0", resetting flip-flop 56, thereby developing a logic "0" at output terminal 72 of flip-flop 56. In addition with output terminal 38 of timer 36 at a logic "1", output terminal 44 of ramp generator 42 is reset to a first level of voltage as shown in waveform 46.

With output terminal 44 of ramp generator 42 at a first voltage level, the output terminals 134a thru 134j of comparators 130a thru 130j are at a logic "1". With output terminals 134a thru 134j of comparators 130a thru 130j at a logic "1", the output terminals 142a thru 142j of OR gates 138a thru 138j and terminals 144a thru 144j of flip-flops 146a thru 146j are also at a logic "1". With terminals 144a thru 144j at a logic "1" level, terminals 152a thru 152j of indicator and unit current sinks 154a thru 154j are at a logic "0". With terminals 152a thru 152j at a logic "0", output terminals 158a thru 158j of indicator and unit current sinks 154a thru 154j are also at a logic "0". With terminals 158a thru 158j at a logic "0", optoisolators 160a thru 160j produce a logic "0" at data terminals 162a thru 162j of latches 164a thru 164j.

With terminals 152a thru 152j of indicator and unit current sinks 154a thru 154j at a logic "0", no current flows into terminals 156a thru 156j from master voltage source 208 of circuitry 34. Wtih no current flow through maximum adjustment 210, the voltage at terminals 212 of maximum comparator 206 and terminal 250 of alarm comparator 248 is at a voltage equal to the master voltage source. With terminals 212 and 250 at the voltage produced by the master voltage source, output terminals 214 and 252 of comparators 206 and 248, respectively, are at a logic "0". With output terminal 44 of ramp generator 42 at a first voltage level ramp level sensor 222 of circuitry 34 produces a logic "0" at gate 218 of OR gate 60. With a logic "0" on gates 216 and 218 of OR gates 60, gate 52 of OR gate 50 and terminals 54 of flip-flop 56 are at a logic "0". With terminal 54 at a logic "0" and terminal 63 at a logic "1", terminal 72 of flip-flop 56 goes to a logic "0". However, since terminal 48 of OR gate 50 is at a logic "1", enable terminal 76 of counter 78 remains at a logic "1".

With output terminal 252 of alarm comparator 248 at a logic "0", alarm relay 254 is de-energized which maintains alarm 256 in a de-energized state and provides B+ to the circuitry of FIGS. 2c and 2d.

At T1 voltage an output terminal 38 of timer 36 goes to a logic "0". With a logic "0" on terminals 48 and 52 of OR gate 50 and terminals 72 of flip-flop 56, enable terminal 76 of counter 78 goes to a logic "0". With the voltage at enable terminal 76 of counter 78 at a logic "0", the signal at terminal 84 of clock 82 produces clocking of the counter 78, thereby changing the terminal of output terminals 92 whch is at a logic "1" level each time the signal at output terminal 84 of clock 82 goes from a logic "0" to a logic "1" level. This clocking at output terminals 92 while assuming a logic "1" at common terminal 100 of AND gates 98 provides clocking of output terminals 102 of AND gates 98.

Also, with a logic "0" at terminal 38 of timer 36, ramp generator 42 produces a negative going ramp at output terminal 44 during the interval T1-T3 as shown in waveform 46. Assuming that the voltage produced by thermal sensor 28a is greater than any of the voltage produced by thermal sensors 28b thru 28j, thermal sensor 28a will produce a logic "1" at the data terminal 162a of latch 164a before thermal sensors 28b thru 28j produce a logic "1" at data terminals 162b thru 162j of latches 164b thru 164j. Making the aforestated assumption, as the voltage at output terminal 44 of ramp generator 42 decreases to a voltage which is slightly less than the voltage produced by thermal sensor 28a at output terminal 27a, the output terminal 134a of comparator 130a will go to a logic "0". Since it has been assumed that the voltage at terminal 140a of OR gate 138a is the logic "0" for explanation of the operation of FIGS. 2a and 2b, the change to a logic "0" at terminal 134a of comparator 130a will produce a logic "0" at terminal 144a of flip-flop 146a. With terminal 144a of flip-flop 146a at a logic "0" the next time a logic "1" is produced at terminal 148a of flip-flop 146a, the output terminal 150a of flip-flop 146a will change to a logic "1". With output terminal 150a at a logic "1" indicator and unit current sink 154a will provide for one unit of current flow into terminal 156a from master voltage source 208. Also, optoisolator 160a produces a logic "1" at terminal 162a of latch 164a when terminal 152a goes to a logic "1".

As the voltage at terminal 44 of ramp generator 42 continues to decrease, the thermal sensors 28b thru 28j will produce logic "0" voltages at the output of their respective comparators as the voltage at terminal 44 becomes less than the voltage produced by a particular thermal sensor. As can be seen, the order of development of a logic "1" voltage at data terminals of latches in each of the channels 30aa thru 30ja will be in the same order as the levels of voltages produced by the thermal sensors 28a thru 28j.

If all the thermal sensors 28a thru 28j consistently produced all different magnitudes of voltage, the counter pulses produced at terminals 102 of AND gates 98 would not be necessary and the output of the comparators 130a thru 130j could be directly coupled to their respective indicator and unit current sinks 154a thru 154j. Realistically, however, it is possible for more than one thermal sensor 28a thru 28j to produce substantially euqal voltages at output terminals 27a thru 27j. It is therefore necessary to provide means for separating the activation of channels 30aa thru 30ja in which the thermal sensors 28a thru 28j do, in fact, produce substantially equal voltages. This separation of activation is provided for by means of the clocking signals produced at the output terminals of AND gates 98. As can be seen, if more than one thermal sensor is producing substantially equal voltages, as the voltage at output terminal 44 of ramp generator 42 reaches that common voltage, only one indicator and unit current sink 154a thru 154j can be activated at any one time since only that flip-flop 146a thru 146j having a logic "1" at terminal 148a thru 148j can be activated at any one time. Therefore, it is possible to stop the process of activation of channels 30a thru 30ja at any predetermined number even if all thermal sensors 28a thru 28j are producing identical signals.

As each indicator and unit current sink 154a thru 154j is activated, the current flow through maximum adjustment 210 of circuitry 34 increases and the voltage at terminals 212 and 250 of comparators 206 and 248 decrease. When the voltage at terminal 212 drops below the voltage at terminal 204 of comparator 206, the output terminal 214 and input terminal 216 of OR gate 60 go to a logic "1". With terminal 216 of OR gate 60 at a logic "1", terminals 52 of OR gate 50 and 54 of flip-flop 56 go to a logic "1". With a logic "1" on terminal 52 of OR gate 50, gate 66 of OR gate 68 and enable terminal 76 of counter 78 go to a logic "1". With a logic "0" on terminal 63 and a logic "1" on terminal 54 of flip-flop 56, gate 70 of OR gate 68 goes to a logic "1". With a logic "1" at terminal 70 of OR gate 68 regardless of the logic state of signal at terminal 52 of OR gate 50, the enable terminal 76 of counter 78 remains at a logic "1". The presence of a logic "1" at terminal 76 stops the counting process in response to the signal at terminal 84 of clock 82. The termination of clocking stops the activation of channels 30aa thru 30ja.

When terminal 76 of counter 78 goes to a logic "1", differentiator circuit 80 produces a short duration positive pulse at output terminal 81 and clock terminals 166a thru 166j of latches 164a thru 164j. This positive pulse produces at output terminals 168a thru 168j the same logic level as exists at 162a thru 162j and holds that logic level after the positive pulse at terminal 81 until the next positive pulse at terminal 81.

If more than ten conditioning equipment systems must be controlled by the energy allocator system, additional decades of channels similar to channels 30aa thru 30ja can be coupled to terminals 104, 120, 122, 258, and 259. The number of additional decades which are coupled to these terminals determines the position in which switch 118 associated with counter 108 must be placed. By providing counter 108, the signals produced by counter 78 at output terminals 92 can be utilized as described above in clocking of the additional decades.

Flip-flop 56 is provided in order that after a predetermined number of channels determined by circuitry 34 have been activated if any of the terminals 140a thru 140j of OR gates 138a thru 138j go to a logic "1" level during the interval T2-T0', as shown in waveform 62 at terminals 52 of OR gate 50 and terminal 54 of flip-flop 56, the counter 78 will remain disabled until the timer 36 produces a logic "1" level at output terminal 38. The flip-flop 56, therefore, prevents any selection of channels 30aa thru 30ja for activation except during the interval T1-T3 as shown in waveform 46.

Ramp level sensor 222 coupled to OR gate 60 provides for the disabling of counter 78 at T3 regardless of the number of channels 30aa thru 30ja activated during the interval T1-T3. Therefore, the ramp level sensor prevents any random allocation of channels during the interval between reset pulses developed by timer 36.

As channels 30as thru 30ja are activated in accordance with the priorities established by thermal sensors 28a thru 28j, the environments in which the conditioning equipment systems are placed alter the environmental conditions which results in a reduction of the voltage produced by the thermal sensors 28a thru 28j in the corresponding environments. As the voltage produced by thermal sensors 28a thru 28j reduces, the averaging circuit 224 operating in conjunction with maximum reference voltage source 200 reduces the voltage at terminal 204 of maximum comparator 206. As the voltage at terminal 204 of comparator 206 is reduced, fewer indicator and unit current sinks 154a thru 154j must be activated to reduce the voltage at terminal 212 of comparator 206 to a level which produces a logic "1" at output terminal 214. This reduction of the number of indicator and unit current sinks 154a thru 154j in response to a reduction in the average voltage produced by thermal sensors 28a thru 28j provides for proportional control by the energy allocator system 11. By providing proportional control, it is possible to reach the desired temperature conditions in each of the environments without going substantially below the desired temperature condition in the case of cooling conditioning equipment systems. Also, in the case of cooling conditioning equipment systems in geographic locations where it is most desirable to not only accomplish the desired temperature conditions in the various environments, but it is also desirable to attain a relatively low humidity level in the various environments by providing proportional control, it is possible to provide for greater humidity reduction by maintaining more equipment operational for a greater duration of time.

To provide for energy allocator system versatility to suit customer needs, adjustments such as maximum adjustment 210, total adjustment 230, minimum adjustment 234, slope adjustment 236, and alarm adjustment 244, have been provided that allow for virtually an infinite number of combinations of control of the interface between the averaging circuit 224 and reference voltage source 200. A more detailed description of the operation of these various circuits associated with reference voltage source 200 will be provided in conjunction with FIG. 4.

In FIGS. 2c and 2d, as in FIGS. 2a and 2b, only two control channels are illustrated and enclosed by dotted lines and these control channels are identified as 30ab and 30jb. These control channels interconnect with and operate in conjunction with control channels 30aa and 30ja of FIGS. 2a and 2b. The circuitry identified as 302 is that portion of the energy allocator system which provides for the initial activation of only one of the plurality of control channels 30ab thru 30jb at a time, thereby providing for energization of only one piece of conditioning equipment at a time from the equipment power when there is a power failure or when two or more pieces of conditioning equipment are selected to be allocated energy by the energy allocator system during a given interval of time.

A clock 304 produces a signal at an output terminal 306, which has a waveform 308 when the signal at enabling terminal 310 is a a logic "0". When terminal 310 is at a logic "1", the signal at terminal 306 is maintained at a logic "0". Terminal 306 is coupled to a clock input terminal 312 of a counter 314. An enabling terminal 316 and a reset terminal 318 are coupled to reference potential and allow for clocking of the counter 314 each time signal at terminal 312 makes the transition from a logic "0" to a logic "1". As clocking occurs, one of a plurality of output terminals 320 which was previously at a logic "1", goes to a logic "0" and the next terminal in numerical order goes from a logic "0" to a logic "1". This process repeats itself each period of the clocking signal at input terminal 312, thereby causing a continuous ripple of logic "1" signals at the output terminals 320 until terminal 310 of clock 304 goes to a logic "1" level.

A carry-out terminal 322 makes a transition from a logic "0" level to a logic "1" level when terminal "0" of output terminals 320 makes a transition from a logic "0" level to a logic "1" level, thereby providing a signal which occurs every ten counts of counter 314.

Each of the output terminals 320 are coupled to one of a plurality of first gates 324 of a plurality of dual input AND gates 326. The second gates of AND gates 326 are all coupled to a common input terminal 328. Output terminals 330 and AND gates 326 provide signals which are identical to the signals at output terminals 320 of counter 314 when gate terminal 328 is at a logic "1". When the signal at gate terminal 328 is at a logic "0", all of the output terminals 330 are at a logic "0".

The output terminals 320 of counter 314 are also coupled to a plurality of terminals 332 which provide counting pulses to the input terminals of AND gates similar to 326 which are used to provide counting pulses to additional decades of control channels (not shown).

Terminal 322 of counter 314 is coupled to a clock terminal 334 of a multiplying counter 336. The enabling terminal 338 of counter 336 is coupled to reference potential and provides for continuous response of a plurality of output terminals 340 to clock pulses occurring at clock terminal 334. The reset terminal 342 operates in conjunction with a switch 344, a switch 346, and output terminals 340 in the same manner as reset terminal 114 operates in conjunction with switch 116, switch 118, and output terminals 114 as shown in FIG. 2a and described hereinabove. Also, terminals 348 and 350 coupled to counter 336 provide for additional decades as explained in conjunction with FIG. 2a.

In order to provide for simplification of the explanation of the operation of channels 30ab thru 30jb, only one channel will be described in detail. A first gate 352a of AND gate 354a of channel 30ab is coupled to a separate one of a plurality of output terminals 330 of AND gates 326. The first gate terminal 352a in turn is coupled to a first gate 356a of an AND gate 358a. Output terminal 360a of AND gate 358a is coupled to the anode of a diode 362a. Cathode of diode 362a is coupled to the terminal 364, which provides the signal to additional decades, and to an enabling terminal 366 of a one shot 368. An output terminal 370 of one shot 368 produces a signal having a waveform 372 which is at a logic "0" when the signal at terminal 366 is at a logic "0" and goes to a logic "1" for a fixed duration of time following a logic "1" pulse at terminal 366. The output terminal 370 is coupled to terminal 310 of clock 304; to a terminal 374, which provides a signal to additional decades; and to a second gate 376a of an AND gate 354a.

A one shot 378 produces at an output terminal 380 a signal having a logic "1" level for a predetermined duration of time after B+ is applied to one shot 378 and maintains thereafter a logic "0" level at output terminal 380 as long as the source of B+ is maintained. The output terminal 380 is coupled to the cathode electrode of a diode 382a. The anode electrode of diode 382a is coupled through a resistor 384a to terminal 168a of latch 164a as shown in FIG. 2a. The anode electrode of diode 382a is also coupled to a first gate 386a of AND gate 388a; a first gate 390a of AND gate 392a; and a first gate 394a of exclusive OR gate 396a.

The output terminal 398a of AND gate 354a is coupled to a second gate 400a of AND gate 388a. The output terminal 402a of AND gate 388a is coupled to a first gate 404a of OR gate 406a. The output terminal 408a is coupled to second gate 410a of exclusive OR gate 396a and a second gate 412a of AND gate 392a.

The output terminal 414a of exclusive OR gate 396a is coupled to a second gate 416a of AND gate 358a. An output terminal 418a of AND gate 392a is coupled to a second gate 420a of OR gate 406a.

In operation, when B+ is initially applied to the circuit of FIGS. 2c and 2d through alarm relay 254 of FIG. 2b, the output terminal 380 of one shot 378 goes to a logic "0". With terminal 380 at a logic "0", the voltage at gate 386a of AND gate 388a, gate 390a of AND gate 392a, and gate 394a of exclusive OR gate 396a are clamped to approximately a logic "0" level. With gates 386a and 390a at a logic "0" level, output terminal 408a of OR gate 406a is at a logic "0" level.

At the end of the interval determined by the one shot 378, output terminal 380 goes to a logic "1" level, thereby reversing biasing diode 382a and allowing the logic level at gates 386a, 390a, and 394a to assume the logic level at terminal 168a of latch 164 as shown in FIG. 2a.

If it is first assumed that all output terminals 168a thru 168j of latches 164a thru 164j as shown in FIGS. 2a and 2b are all at a logic "0" level, when the output terminal 380 of one shot 378 goes to a logic "1" level then output terminals 408a thru 408j remain at a logic "0" level.

With gate 394a of exclusive OR gate 396a and output terminal 408a of OR gate 406a at a logic "0" level, gate 416a and output 360a of AND gate 358a are at a logic "0" level. With output terminal 360a of AND gate 358a at a logic "0" level, the output terminal 370 of one shot 368 is also at a logic "0" level and clock 304 is producing a signal having the waveform 308 at terminal 312 of counter 314. With clock 304 producing a signal at terminal 312, counter 314 produces clocking pulses at output terminals 320. Assuming a logic "1" at common gate terminal 328 of AND gates 326, the clocking pulses at output terminals 320 are reproduced at output terminals 330 of AND gates 326.

When gate 386a of AND gate 388a, gate 390a of AND gate 392a, and gate 394a of exclusive OR gate 396a go to a logic "1" level, output terminal 408a of OR gate 406a remains at a logic "0" level, and output terminal 414a of exclusive OR gate 396a goes to a logic "1" level. Upon the next occurrence of a logic "1" level at gate 352a of AND gate 354a and gate 356a of AND gate 358a as a result of clocking of counter 314, the output terminal 360a of AND gate 358a goes to a logic "1" level and the output terminal 370 of one shot 368 goes to a logic "1" level for a predetermined duration of time. During the interval that terminal 370 of one shot 368 is at a logic "1" level, the clock 304 is disabled, terminating the production of signal at terminal 306 of clock 304, thereby holding a logic "1" level at gate 352a of AND gate 354a and gate 356a of AND gate 358a.

With a logic "1" level at gates 352a and 376a of AND gate 354a, gate 400a of AND gate 388a goes to a logic "1" level. With a logic "1" level on gate 400a and 386a of AND gate 388a, gate 404a of OR gate 406a is at a logic "1" level and output terminal 408a goes to a logic "1" level. With gate 412a and gate 390a of AND gate 392a at a logic "1" level, gate 420a of OR gate 406a goes to a logic "1" level. With gates 394a and 410a of exclusive OR gate 396a at a logic "1" level, the output terminal 414a of exclusive OR gate 396a and output terminal 360a of AND gate 358a goes to a logic "0" level. With output terminal 360a going to a logic "0" level, the output terminal 370 of one shot 368 can return to a logic "0" level at the end of the one shot interval.

When the logic level at output terminal 370 of one shot 368 returns to a logic "0" level, clock 304 starts the production of pulses at output terminal 306, and output terminal 398a of AND gate 354a goes to a logic "0" level. With output terminal 398a at a logic "0" level, output terminal 402a of AND gate 388a and gate 404a of OR gate 406a are at a logic "0" level. The output terminal 408a of OR gate 406a, however, remains at a logic "1" level because output terminal 418a of AND gate 392a remains at a logic "1" level since both gates 412a and 390a are at a logic "1" level.

This process of establishing at output terminal 408a thru 408j the logic level established at output terminals 168a thru 168j of latches 164j thru 164j of FIGS. 2a and 2b continues as described above in a progression determined by the counting sequence of counter 314. The time duration between activation of each of the channels is not less than the interval over which the one shot 368 produces a logic "1" level at output terminal 370. With this system there is absolute guarantee, absent of failure of the system, that no two channels 30ab thru 30jb are activated at the same time.

It can also be readily seen that in the absence of B+ to the circuitry of FIGS. 2c and 2d, the output terminals 408a thru 408j of OR gates 406a thru 406j are at a logic "0" level.

In FIG. 2e, as in FIGS. 2a through 2d, only two control channels are illustrated and enclosed by dotted lines and those control channels are identified as 30ac and 30jc. These control channels 30ac and 30jc are coupled between sections 16aa and 16ab of conditioning equipment 16a and between sections 16ja and 16jb of conditioning equipment system 16j, respectively. Although only two control channels are illustrated in this portion of the energy allocator system 11, the energy allocator system as illustrated actually includes ten channels similar to that explained above in conjunction with FIGS. 2a thru 2d.

The conditioning equipment power 12 provides power for energizing all of the conditioning equipment 18a thru 18j. In order to simplify the explanation of the operation of the energy allocator system 11 operating in conjunction with the conditioning equipment systems, only one channel of the total of ten channels will be explained.

The conditioning equipment power is coupled to a first terminal 502a of contactor 20a. Section 16aa of conditioning equipment system 16a has a separate contactor power 22a for energizing the contactor 20a. Contactor power 22a is coupled through a thermostat 24a, current sensor 504a, and a first set of contacts (not shown) of control relay 508a by way of a terminal 506a of control relay 508a to an energizing terminal 26a of contactor 20a. The first contacts (not shown) of control relay 508a is bypassed by means of a current partial bypass 512a in order that a predetermined small amount of current flow be maintained from the contactor power 22a into the contactor 20a when the contacts (not shown) of thermostat 24a are closed even though the first contacts of control relay 508a are open. If, however, the contacts of thermostat 24a are open, no significant current will flow from the contactor power 22a to contactor 26a. If the current determined by the current partial bypass 512a or by the closure of the first contacts of the control relay 508a flows through the current sensor 504a, the output terminal 514a of current sensor 504a will be at a logic "0". If, however, there is not significant current flow from contactor power 22a to the corresponding contactor 20a, the signal at terminal 514a of current sensor 504a will be at a logic "1". Second contacts (not shown) of control relay 508a are coupled through an output terminal 516a to indicator 518a, thereby providing an indication when the control relay 508a has been energized. Energizing terminal 520a of control relay 508a is coupled to output terminal 408a of OR gate 406a as shown in FIG. 2c. When the signal at terminal 520a is at a logic "0" level, the first and second contacts of control relay 508a are open. When the signal at terminal 520a of control relay 508a is at a logic "1", the first and second contacts of control relay 508a are closed.

The output terminal 514a of current sensor 504a is coupled through FIG. 2c to terminal 140a of OR gate 138a in FIG. 2a.

In FIG. 3, a more detailed version of the indicator and unit current sink 154 and optoisolator 160 as shown in FIGS. 2a and 2b are shown. Input terminal 152 is provided with a logic "1" level when indicator and unit current sink 154 is to be activated. With a logic "1" level at terminal 152, current flows from terminal 156 through a series combination of LED 806, LED 804 of optoisolator 160, the collector-emitter junction of a transistor 800 and an emitter resistor 802 to reference potential. Current flow through this series combination is determined by the voltage level at terminal 152 and the resistor 802. Assuming a relatively constant voltage at terminal 152 and a fixed resistor 802, the current flow into terminal 156 is relatively constant. With current flowing through LED 806, a visual indication is provided to anyone examining the system that the channel utilizing indicator and unit current sink 154 and optoisolator 160 has been activated. LED 804 provides a source of energy which establishes a sufficient conduction through the collector-emitter junction of a transistor 808 in series combination with a resistor 810 between B+ and reference potential to establish a voltage at an output terminal 812 approximately equal to B+. Therefore, with a logic "1" at terminal 152 of indicator and unit current sink 154, B+ is developed at output terminal 812 of optoisolator 160.

The information necessary to drive the circuitry coupled to output terminal 812 could be directly obtained from input terminal 152. However, if there is a failure associated with the indicator and unit current sink 154, it is possible to provide an output signal at output terminal 812 and not develop a current into terminal 156 of indicator and unit current sink 154. This type of failure would provide for an energization of more conditioning equipment systems than the predetermined maximum determined by the circuitry 34 of FIG. 2b. It was therefore deemed advisable to use the optoiso-lator to improve the reliability of the performance of the energy allocator system.

FIG. 4 is a block and schematic diagram of a more detailed version of the portion of the block diagram shown in FIG. 2b and identified as Item 34. The heart of circuitry 34 is a maximum reference zener diode 600 which has its cathode terminal coupled to a source of B+++ (e.g., plus 30 volts) and its anode coupled through an alarm adjustment rheostat 244 to a terminal 246 of comparator 248, and through a series combination of the collector-emitter junction of a transistor 602 and a resistor 604 to reference potential. The base electrode of transistor 602 is coupled to a source of B+ (e.g., plus 12 volts). With plus 12 volts on the base of transistor 602, and with a resistor 604 having a fixed value of resistance, the current through the collector-emitter junction of transistor 602 is substantially constant. The resistance value of resistor 604 is chosen to provide sufficient current flow through zener diode 600 to maintain a stable voltage at the anode of diode 600 with respect to B+++. The voltage rating of zener diode 600 is determined by the voltage selected for B+++ and for B+. With the voltage of +30 volts for B+++ and a voltage of +12 volts for B+, the voltage rating of zener diode 600 was chosen to be 10 volts. However, it may be understood that any one of a number of other voltage ratings may be used.

The anode of zener diode 600 is coupled to the anode of a clamp diode 606, which diode has its cathode coupled to the source of B+++ by means of a resistor 608; to the plus terminal 204 of comparator 206; to reference potential by way of series combination of the collector-emitter junction of the transistor 610 and a minimum adjustment rheostat 234. The base electrode of transistor 610 is coupled to B+. With the base electrode of transistor 610 coupled to B+, the current flow through the parallel combination of resistor 608 and the series combination of zener diode 600 and clamp diode 606 is determined by the value of the minimum current adjustment rheostat 234. Since the current developed by transistor 610 and resistor 234 develops a voltage across the resistor 608 which is less than the voltage rating of the zener diode 600, no substantial current flows through the clamp diode 606 and zener diode 600 as the result of the current developed by transistor 610 and resistor 234.

The cathode of clamp diode 606 is also coupled to reference potential by means of a series combination of the collector-emitter junction of a transistor 612, a slope adjustment rheostat 236, the collector-emitter junction of a transistor 614 and a resistor 616 to reference potential. The base electrode of transistor 614 is coupled to B+, coupled through a resistor 618 to the base electrode of transistor 612, and to terminal "e" of switch 620. The base electrode of transistor 612 is coupled to terminal "f" of switch 620 of maximum/minimum check switch and indicator 238. Terminal "g" of switch 620 is coupled through a series combination of the collector-emitter junction of a transistor 622 and a resistor 624 to B+++. Terminals "b" and "c" of switch 620 are coupled to reference potential; terminal "a" is coupled through a series combination of resistor 625 and a light emitting diode (LED) 626 to B+++; and terminal "d" is coupled through a series combination of a resistor 628 and a LED 630 to the cathode of clamp diode 606.

The switch 620 has three positions: a normal position wherein the sliding terminals make an electrical connection between terminals "b" and "c" and between "f" and "g"; a maximum test position wherein an electrical connection is made between terminals "c" and "d" and between terminals "g" and "h"; and a minimum test position wherein an electrical connection is made between terminals "a" and "b" and between terminals "e" and "f".

With switch 620 in the minimum test position, base electrode of transistor 612 is coupled to the base electrode of transistor 614 and no substantial current flows through the collector-emitter junction of transistors 612 and 614. Therefore, the only current flow through the resistor 608 is that which is established by transistor 610 operating in conjunction with resistor 234. The LED 626 is provided with a forward current flow through resistor 624 from B+++ and served to indicate that the switch 620 is in the minimum test position.

With the switch 620 in the maximum test position, the current flows from the junction of the cathode of clamp diode 606 and resistor 608 to reference potential through LED 630 and resistor 628. The value of resistor 628 is chosen such that clamp diode 606 is placed in forward conduction, thereby clamping the voltage at the cathode of diode 606 to approximately 10.7 volts with respect to B+++, thereby simulating the maximum voltage which can occur at terminal 204 of comparator 206. The LED 630 serves to indicate that switch 620 is in the maximum test position.

With the switch 620 in the normal position, the base electrode of transistor 612 is coupled to the collector electrode of transistor 622 which allows the voltage at the base electrode of transistor 622 to control the voltage at terminal 204 of comparator 206.

As the transistor 622 is changed in its conduction in response to the voltage on its base electrode with respect to B+++, current flows through resistor 618, thereby establishing a voltage at the base electrode of transistor 612 which is a function of the degree of conduction of transistor 622. As the voltage changes on the base electrode of transistor 612, with respect to B+++, the current flow through the parallel combination of resistor 608 and the series combination of zener diode 600 and clamp diode 606 is increased. Therefore, the voltage at terminal 204 is at a maximum when no current flows through transistor 612 and decreased in proportion to the conduction through transistor 612 until the voltage is clamped by the clamp diode 606. The rate of decrease of the voltage at terminal 204 of comparator 206 in relationship to the conduction of transistor 622 is determined by the slope resistor 236.

A total adjustment rheostat 230 is coupled between the base of electrode of transistor 622 and B+++ and provides for a control of the range of voltage between the base electrode of transistor 622 and B+++ with a fixed range of current flowing through resistor 230 into the collector electrodes of transistors 632 through 641. In the case of additional decades of control channels that are added to the system, rheostat 230 may be changed to accommodate current flow into collector electrodes of transistors coupled to a terminal 642.

Each of the base electrodes of transistors 632 thru 641 are coupled to a respective of the thermal sensors 28a thru 28j which, for example, produce voltages ranging from 1.5 volts to approximately 18 volts and produce approximately 7.5 volts when "set point" and "control point" are equal. With this type of thermal sensor as the demand for conditioning increases the voltage produced by the thermal sensor increases above 7.5 volts. The emitter electrodes of transistor 632 thru 641 are coupled to a source of +7.5 volts by means of emitter resistors 643 thru 652. The +7.5 volts reference is produced at the junction of the series combination of a resistor 653 and a zener diode 654 coupled between B+ and reference potential. With the averaging circuitry 224, as the average voltage produced by the thermal sensors 28a thru 28j increases above 7.5 volts, the current through resistor 230 increases. As the current through resistor 230 increases, the voltage between the base of transistor 622 and B+++ increases, therefore increasing the current flow through transistor 612, which reduces the voltage at terminal 204 of comparator 206.

The maximum adjustment rheostat 210 is coupled between B+++ and terminal 212 of comparator 206, terminal 250 of comparator 248, terminal 654 which is coupled to terminals 156a thru 156j of indicator and unit current sinks 154a thru 154j, and to additional decades. With none of the indicators and unit current sinks 154a thru 154j activated, there is no current flow through resistor 210. With no current flow through resistor 210, the voltage at terminal 212 of comparator 206 and terminal 250 of comparator 248 is B+++. Since some current is flowing through resistors 608, the voltage at terminal 204 of comparator 206 is less than B+++, therefore, the signal at terminal 214 of comparator 206 is at reference potential. As each of the indicator and unit current sinks coupled to terminal 654 are activated, the voltage drop across resistor 210 increases. When the voltage drop across resistor 210 exceeds the voltage across the resistor 608, the output terminal 214 which is coupled to B+ by means of a resistor 656 goes to B+. The output terminal 214 of comparator 206 is also coupled to the gate 218 of OR gate 60. With B+ on gate 218, the output terminal 58 of OR gate 60 will be at a logic "1" level regardless of the logic level at gate 216. With a logic "1" level on output terminal 58 of OR gate 60, the process of activating indicators and unit current sinks coupled to 654 is terminated, and the voltage drop across resistor 210 is maintained at a relatively constant level.

By properly adjusting the resistor 244, the voltage at terminal 246 of comparator 248 can be maintained at a level else than the voltage at terminal 250 of comparator 248 when the activation of indicator and unit current sinks coupled to terminal 654 is properly terminated. Under this condition with the output terminal 252 coupled through a resistor 658 to B+ the voltage at output terminal 252 of comparator 248 and the base electrode of a transistor 660 are at reference potential.

A series combination of energizing coils of relay 254 and the collector-emitter junction of transistor 660 are coupled between B+ and reference potential. When the alarm relay 254 is energized, a first set of contacts close and the alarm 256 is activated and a second set of contacts opened, thereby disconnecting B+ from the circuitry of FIGS. 2c and 2d. In this manner, when there is an alarm, the circuitry of FIGS. 2c and 2d are disabled and the conditioning equipment 18a thru 18j of FIGS. 2e are de-energized.

With the aforementioned alarm system, if a failure occurs which allows the activation of a sufficient number of indicator and unit current sinks coupled to terminal 654 to produce a voltage across resistor 210 such that the voltage at terminal 250 of comparator 248 is less than the voltage at terminal 246 of comparator 248, no current will flow from B+ through resistor 658 to terminal 252 of comparator 248 and therefore current will be allowed to flow from B+ through resistor 658 into the base-emitter junction of transistor 660. The resistor 658 will produce sufficient current flow into the base-emitter junction of transistor 660 to energize the alarm relay, thus activating the alarm 256 and disabling the circuitry of FIGS. 2c and 2d by disconnecting B+ therefrom.

A ramp level sensor 222 includes a series combination of a collector resistor 662 and the collector-emitter junction of a transistor 664, coupled between B+ and reference potential. The collector of transistor 664 is coupled to gate 216 of OR gate 60. A resistor 666 is coupled from the base electrode of transistor 664 to a terminal 668 coupled to terminal 44 of ramp generator 42 of FIG. 2a. The ramp level sensor provides for the production of a logic "1" at output terminal 58 of OR gate 60 when the output signal of ramp generator 42 of FIG. 2a is approximately 1.5 volts or less. The circuitry 222 therefore guarantees termination of the activation of indicator and unit current sinks coupled to terminal 654 when the voltage produced at output terminal 44 of ramp generator 42 of FIG. 2a is less than or equal to 1.5 volts.

FIG. 5 illustrates in block and schematic form a more detailed version of one of the conditioning equipment systems connected to a portion of the energy allocator system illustrated in block form in FIG. 2e. The conditioning equipment power 12 provides a source of alternating current to a primary winding 700 of a transformer 702. Transformer 702 provides for isolation of components coupled to a secondary winding 704 from the source of conditioning equipment power 12 and provides a source of low voltage alternating current normally used in temperature control circuits. One end of winding 704 is coupled through a series combination of a switch 706 of thermostat 24 and a current winding 708 of current transformer 710 to a normally open contact 712 of control relay 508 and through a current bypass resistor 512 to a common contact 714 of control relay 508. The other end of winding 704 is coupled through the coil 716 of contactor 26 to the common terminal 714 of control relay 508.

Another set of contacts, including a normally open contact 718 and a common contact 720, is coupled to indicator 518 and provides for an indication when coil 722 of relay 508 is energized. One end of coil 722 is coupled to B+ and the other is coupled through a collector-emitter junction of a transistor 724 to reference potential. A damper diode 726 is coupled in parallel with coil 722 and has its cathode electrode coupled to B+. A resistor 728 is coupled between the base electrode of transistor 724 and a terminal 730 which is coupled to one of the terminals 408a thru 408j of FIGS. 2c and 2d.

The conditioning equipment power 12 is also coupled through contacts 732 and 734 of contactor 26 to the conditioning equipment 18.

A secondary winding 736 of current transformer 710 is coupled to the parallel combination of the base of enter junction of a transistor 738 and a diode 740 coupled in anti-parallel combination. The series combination of a resistor 742 and the collector-emitter junction of transistor 738 is coupled between B+ and reference potential. A pi-filter 744 is coupled between the collector electrode of transistor 738 and a terminal 746.

In operation, a voltage is produced across the winding 704 of transformer 702 which is capable of energizing the coil 716 of contactor 26 when the switch 706 of thermostat 24 is closed and coil 722 of control relay 508 is energized, thereby connecting terminals 712 and 714.

Since the energy allocator system 11 is going to allocate a predetermined number of conditioning equipment to be connected to the conditioning equipment power 12, it is important to know if the switch 706 of thermostat 24 is open or closed to determine if the corresponding conditioning equipment can be allocated. If no means were provided for determing this, it would be possible for control relay 508 to be energized as the result of circuitry coupled to terminal 730 being activated, thereby making an electrical connection between terminals 712 and 714, and yet since switch 706 is open, contactor 26 could not be energized. Therefore, the system would have allocated a certain number of conditioning equipment to be energized and, in fact, less than that number would be energized.

To avoid the aforementioned problem, the resistor 512 is placed in parallel with the contacts 712 and 714 and the current sensor 504 is provided to sense if current is flowing in the series circuit including the winding 704; switch 706 of thermostat 24; current winding 708; resistor 512; and winding 716 of contactor 26. If switch 706 of thermostat 24 is open, no substantial current will flow through the aforementioned series circuit.

The amount of current flowing through winding 708 as determined by resistor 512 or determined by the winding 716 of contactor 26 when contacts 712 and 714 are closed, produces a current flow through the base-emitter junction of transistor 738 sufficient to saturate the transistor 738. With transistor 738 saturated, the voltage at terminal 746 which is coupled to terminals 140a thru 140j of OR gates 138a thru 138j of FIGS. 2a and 2b is at a logic "0". When substantially no current flows through winding 708, the transistor 738 is cut off and the voltage at terminal 746 goes to B+ (logic "1"). With terminal 746 at logic "1", the output terminals 142a thru 142j of the corresponding OR gates 138a thru 138j are at a logic "1" and presents the activation of the channel coupled to terminal 730, thereby preventing the energization of relay 508. This feedback technique provides that only those control channels capable of actually energizing conditioning equipment will, in fact, be activated.

Turning now to FIG. 6, it is frequently the case that all of the conditioning equipment systems 18a thru 18j (FIG. 1) do not require the same amount of power for their operation. Since the system is designed to maintain a very careful and accurate accounting of how much power is being used at any particular time, these variations in power requirements must be taken into consideration. When a new system is being constructed and installed in a new facility, it will often be the case that all of the conditioning equipment systems 18a thru 18j will have the same power requirements. However, in an older facility, one may encounter, for example, several units having one power requirement when they are operating, an additional group of units having a second power requirement when they are operating, a third group of units having a third power requirement when they are operating, and so on. In order to account for these variations in power requirements, the system of FIG. 6 incorporates a "weighting" function circuit into the system illustrated in the other Figs.

Let it be assumed for purposes of this discussion that a system of conditioning units 18a thru 18j to be controlled includes individual conditioning equipment units having three different levels of power requirement. For purposes of illustration, let it be assumed that different units of this group require one, two, and three kilowatts of power while they are in operation. Let it further be assumed that, of the ten conditioning equipment units 18a thru 18j, four are one-kilowatt units, three are two-kilowatt units, and three are three-kilowatt units. If the maximum allocation, as determined by the set value of resistor 210 in FIG. 6 is seven units, it means that seven one-kilowatt units, or their power consumption equivalent, may be in operation at any given time. It is apparent that if two three-kilowatt units are running at a given time, and additional conditioning capacity is indicated as being required, switching of the third three-kilowatt unit, or any of the two-kilowatt units, will be fatal to the allocation scheme. The system of FIG. 6 is devised to prevent such overallocation.

The system of FIG. 6 "weights" the operative state of each conditioning equipment unit 18a thru 18j, by "weighting" the corresponding units's unit current sink 154a-154j (FIG. 2b) by a factor of 1, 2, or 3, depending upon whether the corresponding conditioning equipment unit 18a-18J is a one-, two-, or three-kilowatt unit.

A string of appropriately-valued weighting function resistors 820, 822, 824 is coupled in series between the B+++ and the input terminal 204 of amplifier 206. These resistors drop the B+++ voltage in equal increments to a "three-weight" voltage at the junction of resistors 820, 822, and to a "two-weight" voltage at the junction of resistors 822. The "three-weight" and "two-weight" voltages are compared in amplifiers 830, 832, respectively, to the voltage at input terminal 212 of the comparator 206 relative to B+++. The output terminals 834, 836 of amplfifiers 830, 832, respectively, are coupled through load resistors 838, 840, respectively, to B+ voltage. Terminals 834, 836 are also coupled to input terminals 842, 844, respectively, of AND gates 850, 852. Input terminals 854, 856 of AND gates 850, 852, respectively, are coupled to the "0" output terminal 112 of counter 108.

The output terminal 860 of AND gate 850 is coupled through jumper 864 to an input terminal of AND gates 98-6. AND gate 98-6 is the one which controls, through its output terminal 102-6 and intervening circuitry (not shown in FIG. 6), one of conditioning equipment units 18a-18j which must be three-weighted according to its higher power requirements. Similarly, the output terminal 862 of AND gate 852 is coupled through jumpers 866, 867, respectively, to input terminals of AND gates 98-1 and 98-7. AND gates 98-1 and 98-7 are ones which control, through their respective output terminals 102-1 and 102-7 and intervening circuitry (not shown in FIG. 6) two of conditioning equipment units 18a-18j which must be two-weighted according to their higher power requirements.

It should be understood that, for those conditioning units 18a–18j which do not require "weighting", their input terminals will be directly coupled to respective output terminals 92 of counter 78 and the "0" output terminal of counter 108 as in the preceding embodiment. For this reason, input terminals of AND gates 98-2, 98-3, 98-4 98-5, 98-8, 98-9, and 98-0 are illustrated as coupled by broken lines to connectors to the output line 869 from "0" terminal of counter 108. As the connections are made in FIG. 6, units 18a and 18g are "two-weighted" units, receiving their inputs through AND gates 98-1 and 98-7, AND gate 852, and comparator 832 from the junction of resistors 822, 824. Unit 18f is a "three-weighted" unit receiving its input through AND gate 98-6, AND gate 850, and comparator 830 from the junction of resistors 820, 822. As indicated in FIG. 6, all of the remaining units 18b, 18c, 18d, 18e, 18h, 18i, and 18j, which are controlled from the remaining output terminals 102-2, 102-3, 102-4, 102-5, 102-8, 102-9, and 102-0 of AND gates 98-2, 98-3, 98-4, 98-5, 98-8, 98-9, and 98-0 are "one-weighted" and are controlled as described in the other embodiments.

In operation, when the voltage at input terminal 212 of comparator 206 is at a level such that, if three additional units of current are caused to flow from unit current sinks 154a–154j through resistor 210 and the maximum allocation will be exceeded, the output terminal 834 of comparator 830 goes to a logic "0" which condition precludes the turning on of unit current sink 154f and the corresponding conditioning equipment 18f. When the voltage at input terminal 212 of comparator 206 is at a level such that if two additional units of current are caused to flow from unit current sinks 154a–154j through resistor 210 and the maximum allocation will be exceeded, the output terminal 836 of comparator 832 goes to a logic "0" which condition precludes the turning on of unit current sinks 154a and 154g and corresponding conditioning equipment 18a and 18g, respectively.

What is claimed is:

1. A system for allocating energy, adapted to be coupled to a plurality of conditioning equipment systems, each altering a corresponding one of a plurality of first conditions in response to a corresponding one of a plurality of first signals comprising:
    first means for developing, in the absence of a second signal, a plurality of third signals in an order determined by the relative deviation of each of said plurality of corresponding first conditions from each of a plurality of corresponding predetermined second conditions; and for developing, in the absence of said second signal and in a controlled order, those of said plurality of third signals identifying those of said plurality of corresponding first conditions having substantially the same deviation from corresponding ones of said plurality of predetermined second conditions; and for developing a fourth signal in response to said second signal;
    second means coupled to said first means for developing said second signal when a predetermined number of said third signals is developed by said first means; and
    third means, coupled to said first means and adapted to be coupled to said plurality of conditioning equipment systems for developing, in response to said fourth signal, said plurality of first signals corresponding to said third signals developed, in the absence of said second signal, by said first means.

2. A system for allocating energy according to claim 1 wherein said first means includes:
    first generating means for developing a fifth signal the level of which varies from a first level to a second level in a predetermined manner during a first interval of time;
    second generating means for developing a plurality of sixth signals each having a level which is a function of the deviation of one of said plurality of first conditions from a corresponding one of said plurality of predetermined second conditions;
    first comparing means, coupled to said first generating means and to said second generating means, for comparing said level of each of said plurality of sixth signals to said level of said fifth signal and for developing a corresponding one of a plurality of seventh signals when said level of said fifth signal has a predetermined relationship with one of said plurality of sixth signals;
    first control means, coupled with said second means and said first generating means, for developing said fourth signal in response to said second signal; and
    first switching means coupled to said first comparing means and said first control means, for developing, in the absence of said fourth signal and during said first time interval, said plurality of third signals corresponding to each of said plurality of seventh signals in an order determined by the order of development of said plurality of corresponding seventh signals and in said controlled order, when said seventh signals are developed at substantially the same time.

3. A system for allocating energy according to claim 2 wherein said second means includes:
    summing means coupled to said first switching means for developing an eighth signal having a magnitude which is proportional to the number of said plurality of third signals developed by said first means;
    first reference means for developing a ninth signal having a predetermined magnitude; and
    second comparing means, coupled to said summing means and said reference means, for developing said second signal when said eighth signal has a predetermined relationship with said ninth signal.

4. A system for allocating energy according to claim 3 wherein said first generating means includes reset means for resetting said fifth signal to said first level during a second interval of time and coupled to said first control means for developing said fourth signal during said second interval of time.

5. A system for allocating energy according to claim 4 wherein said third means includes:
    signal transforming means coupled to said first control means for transforming said fourth signal into a predetermined duration tenth signal; and
    first memory means, coupled to said first switching means and said signal transforming means, for developing, in response to said tenth signal, said plurality of first signals corresponding to said third signals developed, in the absence of said second signal, by said first means.

6. A system for allocating energy according to claim 5 wherein said first memory means further includes second switching means for delaying said plurality of first signals in a manner such that only one of said plurality of first signals will be developed at a time and a minimum predetermined time interval will exist between the development of any two consecutively developed first signals.

7. A system for allocating energy according to claim 6 wherein said second means further includes averaging means, coupled to said first reference means and said second generating means, for developing an eleventh signal which is proportional to the average level of said plurality of sixth signals, thereby providing for control of the magnitude of said ninth signal in response to said average level of said plurality of sixth signals.

8. A system for allocating energy according to claim 7 wherein said second means further includes a second control means, coupled to said first reference means, for controlling the minimum level and rate of change between the maximum level and said minimum level of said ninth signal in response to said eleventh signal.

9. A system for allocating energy according to claim 8 wherein said first switching means includes:
   third generating means, coupled to said first control means, for developing a plurality of twelfth signals in said controlled order in the absence of said fourth signal; and
   second memory means, coupled to said third generating means, said first comparing means and said first memory means, for developing during said first time interval in the absence of said fourth signal, each of said third signals corresponding to said seventh signals developed by said first comparing means, said third signals being developed in the order of development of said seventh signals and in the order of development of said twelfth signals.

10. A system for allocating energy according to claim 9 wherein said summing means includes:
    second reference means for providing a reference signal level;
    current sinking means, coupled to said second memory means, for developing a plurality of uniform signals, each being responsive to a separate one of said plurality of said third signals; and
    common impedance means, coupled to said second reference means and said current sinking means, for developing said eighth signal having a magnitude proportional to the number of said uniform signals developed by said current sinking means.

11. A system for allocating energy according to claim 10 wherein said first memory means further includes third switching means for providing each of said plurality of first signals by way of one of a plurality of contact closures to be adapted to control a corresponding one of said plurality of conditioning equipment systems.

12. A system for allocating energy according to claim 11 wherein said second means further includes:
    third reference means for developing a thirteenth signal having a predetermined magnitude;
    alarm means for providing an identifiable alarm in response to a fourteenth signal; and
    third comparing means coupled to said third reference means, said summing means, and said alarm means for developing said fourteenth signal when said eight signal has a predetermined relationship with said thirteenth signal.

13. A system for allocating energy according to claim 12 wherein said alarm means is coupled to said first memory means for interrupting the production of said plurality of first signals when said fourteenth signal is being produced by said third comparing means.

14. A system for allocating energy according to claim 13 wherein said third means further includes indicating means, coupled to said third switching means, for indicating which of said plurality of first signals is being developed by said first memory means.

15. A conditioning equipment control system comprising:
    a power source;
    a plurality of switches;
    a plurality of conditioning equipment units, each altering a variable in a respective one of a plurality of selected environments or locales, each conditioning equipment system being coupled through a respective one of said switches to the power source for operation thereby, each of said conditioning equipment units having a predetermined, known power demand;
    means for generating a first signal corresponding to a desired value for the variable in a respective environment or locale;
    means for generating a second signal corresponding to an actual value for the variable in a respective environment or locale;
    means for comparing the respective first and second signals and for closing various ones of said switches in response to such comparison, said switches being closed in a controlled order determined by the differences between the respective desired values and actual values;
    means for generating weight signals corresponding to each of said power demands;
    means for combining the weight signals related to the power demands of the various units whose switches are closed;
    means for generating a peak demand reference signal; and
    means for generating a disabling signal when the combined weight signals achieve a predetermined relation to the peak demand reference signal to prevent use of power from said power source in excess of said peak demand.

16. The apparatus of claim 15 wherein at least two of said conditioning equipment units have power demands different from each other, said means for generating weight signals generating a first weight signal corresponding to a first one of said different power demands, said means for generating weight signals further generating a second weight signal difference from the first weight signal and corresponding to the second of said different power demands.

17. The apparatus of claim 16 wherein the means for generating a disabling signal further includes means for predicting when the added weight signal corresponding to the power demand of a unit whose switch is to be closed will result in a combined weight signal violating said predetermined relation to the peak demand reference signal, and for generating said disabling signal in response to such predicted violation.

18. A conditioning equipment control system comprising:
    a power source;
    a plurality of switches;
    a plurality of conditioning equipment units, each altering a variable in a respective one of a plurality of selected environments or locales, each conditioning equipment system being coupled through a respective one of said switches to the power source for operation thereby, each of said conditioning equipment units having a predetermined, known power demand;

means for generating a first signal corresponding to a desired value for the variable in a respective environment or locale;

means for generating a second signal corresponding to an actual value for the variable in a respective environment or locale;

means for generating weight signals corresponding to each of said power demands;

means for generating a peak demand reference signal;

means for comparing the respective first and second signals and for closing various ones of said switches in response to such comparison, said switches being closed in a controlled order determined by the differences between the respective desired values and actual values;

means for combining the weight signals related to the power demands of the various units whose switches are closed; and means for generating a disabling signal when the combined weight signals achieve a predetermined relation to the peak demand reference signal to prevent use of power from said power source in excess of said peak demand;

said comparing means including means for predicting when the added weight signal corresponding to the power demand of a unit whose switch is to be closed will result in a combined weight signal violating said predetermined relation to the peak demand reference signal;

said means for generating a disabling signal also generating said disabling signal in response to such predicted violation.

19. The apparatus of claim 18 wherein at least two of said conditioning equipment units have power demands different from each other, said means for generating weight signals generating a first weight signal corresponding to a first one of said different power demands, said means for generating weight signals further generating a second weight signal different from the first weight signal and corresponding to the second of said different power demands.

20. The apparatus of claim 19 wherein said predetermined relation is equality.

21. A conditioning equipment control system comprising:

a power source;

a plurality of switches;

a plurality of conditioning equipment units, each altering one of a plurality of variables in an environment or locale, each conditioning equipment unit being coupled through at least a respective one of said switches to the power source for operation thereby, and each of said conditioning equipment units having a predetermined, known power demand;

a plurality of means, each for generating a first signal corresponding to a desired value for a selected one of said variables in said environment or locale;

a plurality of means, each for generating a second signal corresponding to an actual value for a selected one of said variables in said environment or locale;

means for comparing the respective first and second signals and for closing various ones of said switches in response to such comparison, said switches being closed in a controlled order determined by differences between the respective desired and actual values;

means for generating weight signals related to each of said power demands;

means for combining the weight signals related to the power demands of the various units whose switches are closed;

means for generating a maximum demand reference signal; and means for generating a disabling signal when the combined weight signals achieve a predetermined relation to the maximum demand reference signal to prevent use of power from said power source in excess of said maximum demand.

22. The apparatus of claim 21 wherein at least two of said conditioning equipment units have power demands different from each other, said means for generating weight signals generating a first weight signal corresponding to a first one of said different power demands, said means for generating weight signals further generating a second weight signal different from the first weight signal and corresponding to the second of said different power demands.

23. The apparatus of claim 22 wherein the means for generating a disabling signal further includes means for predicting when the added weight signal corresponding to the power demand of a unit whose switch is to be closed will result in a combined weight signal violating said predetermined relation to the maximum demand reference signal, and for generating said disabling signal in response to such predicted violation.

24. A conditioning equipment control system comprising:

a power source;

a plurality of switches;

a plurality of conditioning equipment units, each altering one of a plurality of variables in an environment or locale, each conditioning equipment unit being coupled through at least a respective one of said switches to the power source for operation thereby, and each of said conditioning equipment units having a predetermined, known power demand;

a plurality of means, each for generating a first signal corresponding to a desired value for a selected one of said variables in said environment or locale;

a plurality of means, each of generating a second signal corresponding to an actual value for a selected one of said variables in said environment or locale;

means for comparing the respective first and second signals and for closing various ones of said switches in response to such comparison, said switches being closed in a controlled order determined by differences between the respective desired and actual values;

means for generating weight signals related to each of said power demands;

means for combining the weight signals related to the power demands of the various units whose switches are closed;

means for generating a maximum demand reference signal; and means for generating a disabling signal when the combined weight signals achieve a predetermined relation to the maximum demand reference signal to prevent use of power from said power source in excess of said maximum demand;

said comparing means including means for predicting when the added weight signal corresponding to the power demand of a unit whose switch is to be closed will result in a combined weight signal violating said predetermined relation to the maximum demand reference signal;

said means for generating a disabling signal also generating said disabling signal in response to such predicted violation.

25. The apparatus of claim 24 wherein at least two of said conditioning equipment units have power demands different from each other, said means for generating weight signals generating a first weight signal corresponding to a first one of said different power demands, said means for generating weight signals further generating a second weight signal different from the first weight signal and corresponding to the second of said different power demands.

26. The apparatus of claim 25 wherein said predetermined relation is equality.

27. A conditioning equipment control system comprising:

a power source;

a plurality of switches;

a plurality of conditioning equipment units, each altering a variable in a respective one of a plurality of selected environments or locales, each conditioning equipment system being coupled through a respective one of said switches to the power source for operation thereby, each of said conditioning equipment units having a predetermined, known power demand;

means for generating a first signal corresponding to a desired value for the variable in a respective environment or locale;

means for generating a second signal corresponding to an actual value for the variable in a respective environment or locale;

means for comparing the respective first and second signals and for closing various ones of said switches in response to such comparison;

means for closing said switches in a controlled order determined by the differences between the respective desired values and actual values;

means for generating weight signals corresponding to each of said power demands;

means for combining the weight signals related to the power demands of the various units whose switches are closed;

means for generating a peak demand reference signal;

said switch closing means including means for predicting when the added weight signal corresponding to the power demand of a unit whose switch is to be closed will result in a combined weight signal violating a predetermined relation to the peak demand reference signal; and means for generating a disabling signal when said predicted combined weight signal achieves said predetermined relation to the peak demand reference signal to prevent use of power from said power source in excess of said peak demand.

28. A conditioning equipment control system comprising:

a power source;

a plurality of switches;

a plurality of conditioning equipment units, each altering one of a plurality of variables in an environment or locale, each conditioning equipment unit being coupled through at least a respective one of said switches to the power source for operation thereby, and each of said conditioning equipment units having a predetermined, known power demand;

a plurality of means, each for generating a first signal corresponding to a desired value for a selected one of said variables in said environment or locale;

a plurality of means, each for generating a second signal corresponding to an actual value for a selected one of said variables in said environment or locale;

means for comparing the respective first and second signals and for closing various ones of said switches in response to such comparison;

means for closing said switches in a controlled order determined by differences between the respective desired and actual values;

means for generating weight signals related to each of said power demands;

means for combining the weight signals related to the power demands of the various units whose switches are closed;

means for generating a maximum demand reference signal;

said switch closing means including means for predicting when the added weight signal corresponding to the power demand of a unit whose switch is to be closed will result in a combined weight signal violating a predetermined relation to the peak demand reference signal; and means for generating a disabling signal when said predicted combined weight signal achieves said predetermined relation to the maximum demand reference signal to prevent use of power from said power source in excess of said maximum demand.

* * * * *